United States Patent
Nanba

(10) Patent No.: US 9,470,904 B2
(45) Date of Patent: Oct. 18, 2016

(54) ZOOM LENS AND IMAGE PICKUP APPARATUS INCLUDING THE SAME

(71) Applicant: CANON KABUSHIKI KAISHA, Tokyo (JP)

(72) Inventor: Norihiro Nanba, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 14/564,543

(22) Filed: Dec. 9, 2014

(65) Prior Publication Data

US 2015/0185494 A1 Jul. 2, 2015

(30) Foreign Application Priority Data

Dec. 26, 2013 (JP) ................................. 2013-269055

(51) Int. Cl.
*G02B 27/64* (2006.01)
*G02B 15/173* (2006.01)

(52) U.S. Cl.
CPC ........... *G02B 27/646* (2013.01); *G02B 15/173* (2013.01); *G03B 2205/0015* (2013.01); *G03B 2205/0023* (2013.01)

(58) Field of Classification Search
CPC ................ G02B 27/64; G02B 27/646; G02B 15/14–15/16; G02B 15/163–15/167; G02B 15/173; G02B 15/20; G02B 15/22; G02B 15/24; G02B 15/28; G02B 13/004; G02B 13/0045; G02B 13/02; G02B 9/34; G02B 9/60–9/64; G02B 7/02; G02B 7/021; G02B 7/04; G02B 7/10; G02B 7/105; H04N 5/23264; H04N 5/2328; H04N 5/23287; G03B 2205/00–2205/0023; G03B 2205/0046–2205/0084; G03B 5/00–5/06

See application file for complete search history.

(56) References Cited

FOREIGN PATENT DOCUMENTS

| JP | H05-232410 A | 9/1993 | |
| JP | H06-160778 A | 6/1994 | |
| JP | H10-090601 A | 4/1998 | |
| JP | H10-260356 A | 9/1998 | |
| JP | 2012-141598 A | 7/2012 | |
| JP | 2015099216 A | * 11/2013 | ............... G03B 5/00 |

* cited by examiner

*Primary Examiner* — Derek S Chapel
*Assistant Examiner* — Adam W Booher
(74) *Attorney, Agent, or Firm* — Carter, DeLuca, Farrell & Schmidt, LLP

(57) ABSTRACT

Provided is a zoom lens, including, in order from an object side to an image side: a positive first lens unit; a negative second lens unit; a positive third lens unit; a fourth lens unit having one of positive and negative refractive powers; and an aperture stop arranged one of between the second lens unit and the third lens unit, within the third lens unit, and between the third lens unit and the fourth lens unit. In the zoom lens, a shift image stabilizing unit configured to be moved in a direction perpendicular to an optical axis to perform image blur correction and a tilt image stabilizing unit configured to be rotated with one of a point on the optical axis and a point near the optical axis as a rotation center to perform image blur correction are arranged in appropriate positions, respectively.

16 Claims, 21 Drawing Sheets

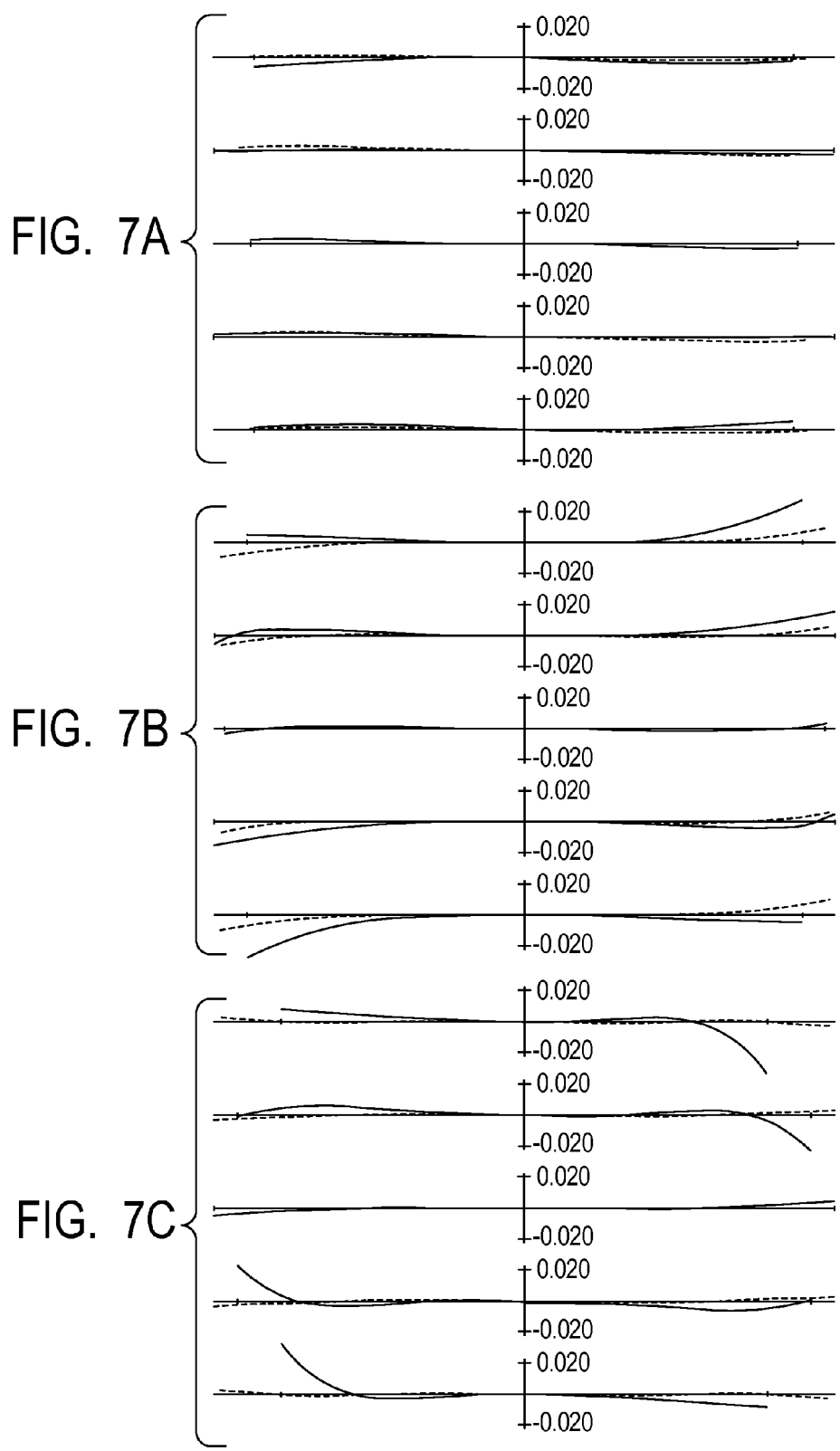

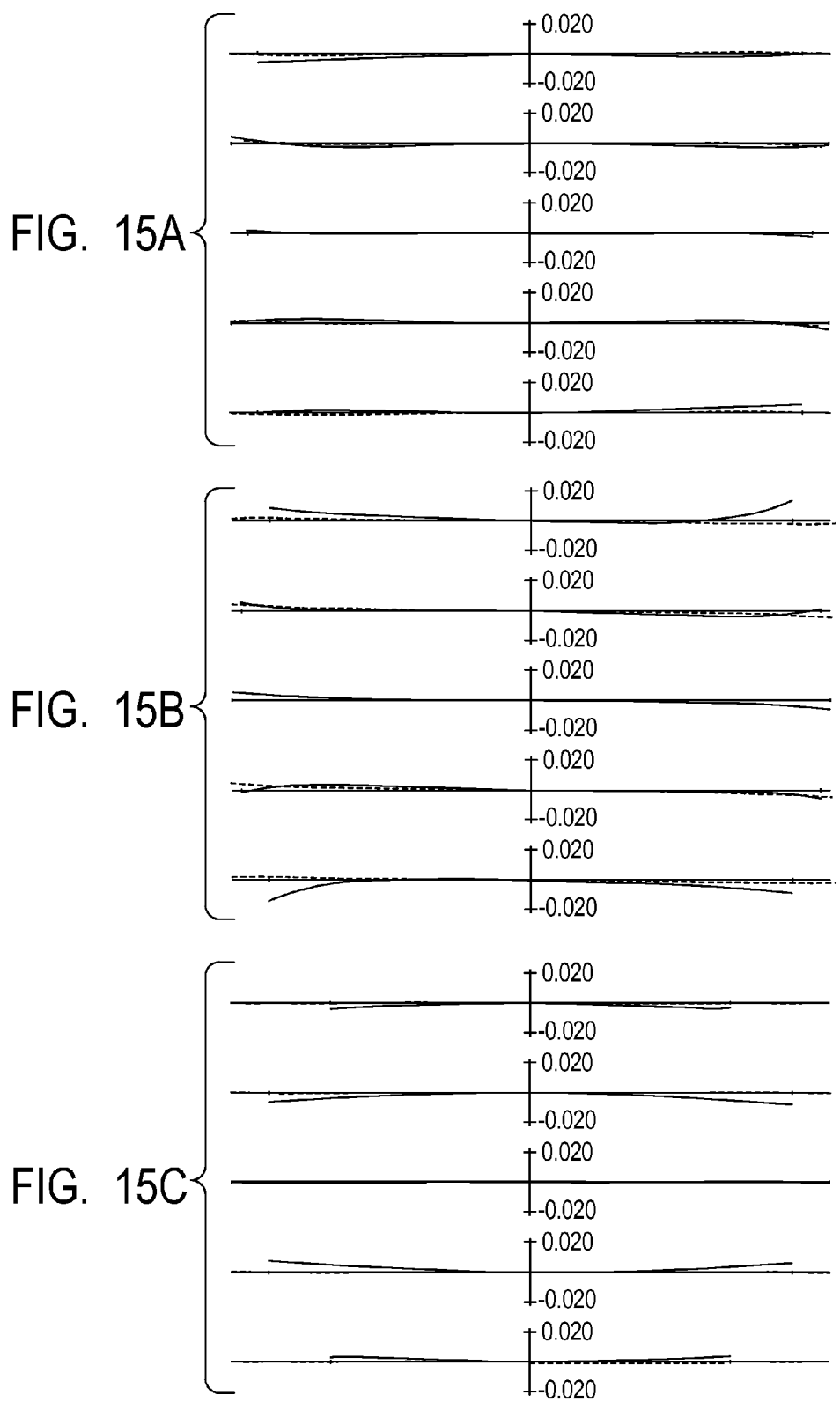

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which are suitable for an image pickup apparatus using an image pickup element, such as a video camera, an electronic still camera, a broadcasting camera, or a monitor camera, or an image pickup apparatus such as a silver-halide film camera.

2. Description of the Related Art

A zoom lens having a short total lens length (a distance from a first lens surface to an image plane), a high zoom ratio, and a high optical characteristic all over the entire zoom range is required for a photographing optical system for use in an image pickup apparatus. The zoom lens having a high zoom ratio has a tendency that in general, the entire system becomes large and the weight becomes heavy. When the zoom lens becomes large in size and heavy in weight, the zoom lens is vibrated due to camera shake or the like during the photographing in many cases, and hence the image blur is more liable to occur in the photographed image.

There is known a zoom lens in which a part of a lens system is shifted in a direction perpendicular to an optical axis, to thereby correct the image blur. In Japanese Patent Application Laid-Open No. H10-260356, in a four-unit zoom lens including, in order from an object side to an image side, a first lens unit having a positive refractive power, a second lens unit having a negative refractive power, a third lens unit having a positive refractive power, and a fourth lens unit having a positive refractive power, the image blur is corrected by shifting the third lens unit.

In Japanese Patent Application Laid-Open No. H10-090601, in a five-unit zoom lens including, in order from an object side to an image side, first to fifth lens units having positive, negative, positive, negative, and positive refractive powers, respectively, the image blur is corrected by shifting the fourth lens unit. In addition, there is known a zoom lens in which a part of a lens system is rotated (tilted) with a point on an optical axis as a center, to thereby correct the image blur. In Japanese Patent Application Laid-Open No. H06-160778, in a four-unit zoom lens including, in order from an object side to an image side, first to fourth lens units having positive, negative, positive, and positive refractive powers, respectively, the image blur is corrected by tilting the first lens unit.

In addition, there is known a zoom lens aimed at reducing aberrations occurring during the image blur correction. In Japanese Patent Application Laid-Open No. 2012-141598, in a zoom lens including, in order from an object side to an image side, first to fourth lens units having positive, negative, positive, and negative refractive powers, respectively, a image stabilizing unit is provided within the fourth lens unit. In addition, a plurality of shift image stabilizing units are provided within the fourth lens unit, and the respective shift image stabilizing units are used properly depending on changes in a focal length.

In addition, there is known a zoom lens in which a image stabilizing unit as a part of a lens system is shifted in a direction perpendicular to an optical axis, and a image stabilizing unit is rotated with one point on an optical axis as a rotation center, to thereby correct the image blur. In Japanese Patent Application Laid-Open No. H05-232410, in a four-unit zoom lens including, in order from an object side to an image side, first to fourth lens units having positive, negative, positive, and positive refractive powers, respectively, an image blur is corrected by shifting and tilting the second lens unit.

In general, in order to carry out precisely the image blur correction and reduce an aberration variation during the image blur correction in the zoom lens having a image stabilizing function, it is important to appropriately set a lens configuration of the zoom lens, a lens configuration of the image stabilizing unit for the image blur correction, and the like. If the lens configuration of the image stabilizing unit, which is moved for the image blur correction is not proper, the image blur correction becomes insufficient, an amount of occurrence of a decentering aberration during the image stabilization becomes large, and it becomes difficult to maintain a high optical characteristic during the image stabilization.

SUMMARY OF THE INVENTION

According to one embodiment of the present invention, there is provided a zoom lens, including, in order from an object side to an image side: a first lens unit having a positive refractive power; a second lens unit having a negative refractive power; a third lens unit having a positive refractive power; a fourth lens unit having one of positive and negative refractive powers; an aperture stop arranged one of between the second lens unit and the third lens unit, within the third lens unit, and between the third lens unit and the fourth lens unit, the zoom lens being configured such that, during zooming from a wide angle end to a telephoto end, an interval between the first lens unit and the second lens unit is widened, an interval between the second lens unit and the third lens unit is narrowed, and an interval between the third lens unit and the fourth lens unit is changed; and a plurality of image stabilizing units configured to be moved in a direction in which the direction has a component in a direction perpendicular to an optical axis during image blur correction. In the zoom lens, at least one of the plurality of image stabilizing units is a shift image stabilizing unit configured to be moved in the direction perpendicular to the optical axis to carry out the image blur correction, at least one of the plurality of image stabilizing units is a tilt image stabilizing unit configured to be rotated with a point on the optical axis as a rotation center to carry out the image blur correction, and the tilt image stabilizing unit is located closer to the object side than the aperture stop, and the shift image stabilizing unit is located closer to the image side than the tilt image stabilizing unit.

Further features of the present invention will become apparent from the following description of exemplary embodiments with reference to the attached drawings.

BRIEF DESCRIPTION OF THE DRAWINGS

FIG. 7A is a lateral aberration diagram at the wide angle end of the zoom lens according to Example 2 of the present invention.

FIG. 7B is a lateral aberration diagram at the intermediate zoom position of the zoom lens according to Example 2 of the present invention.

FIG. 7C is a lateral aberration diagram at the telephoto end of the zoom lens according to Example 2 of the present invention.

FIG. 15A is a lateral aberration diagram at the wide angle end of the zoom lens according to Example 4 of the present invention.

FIG. 15B is a lateral aberration diagram at the intermediate zoom position of the zoom lens according to Example 4 of the present invention.

FIG. 15C is a lateral aberration diagram at the telephoto end of the zoom lens according to Example 4 of the present invention.

DESCRIPTION OF THE EMBODIMENTS

Now, exemplary embodiments of the present invention are described in detail with reference to the attached drawings. The zoom lens of the present invention includes, in order from an object side to an image side: a first lens unit having a positive refractive power; a second lens unit having a negative refractive power; a third lens unit having a positive refractive power; and a fourth lens unit having one of positive and negative refractive powers. The zoom lens of the present invention further includes an aperture stop arranged one of between the second lens unit and the third lens unit, within the third lens unit, and between the third lens unit and the fourth lens unit. During zooming from a wide angle end to a telephoto end, an interval between the first lens unit and the second lens unit is widened, an interval between the second lens unit and the third lens unit is narrowed, and an interval between the third lens unit and the fourth lens unit is changed.

Here, it is only necessary that the lens unit include one or more lenses, and the lens unit does not necessarily include a plurality of lenses.

Figure 1:
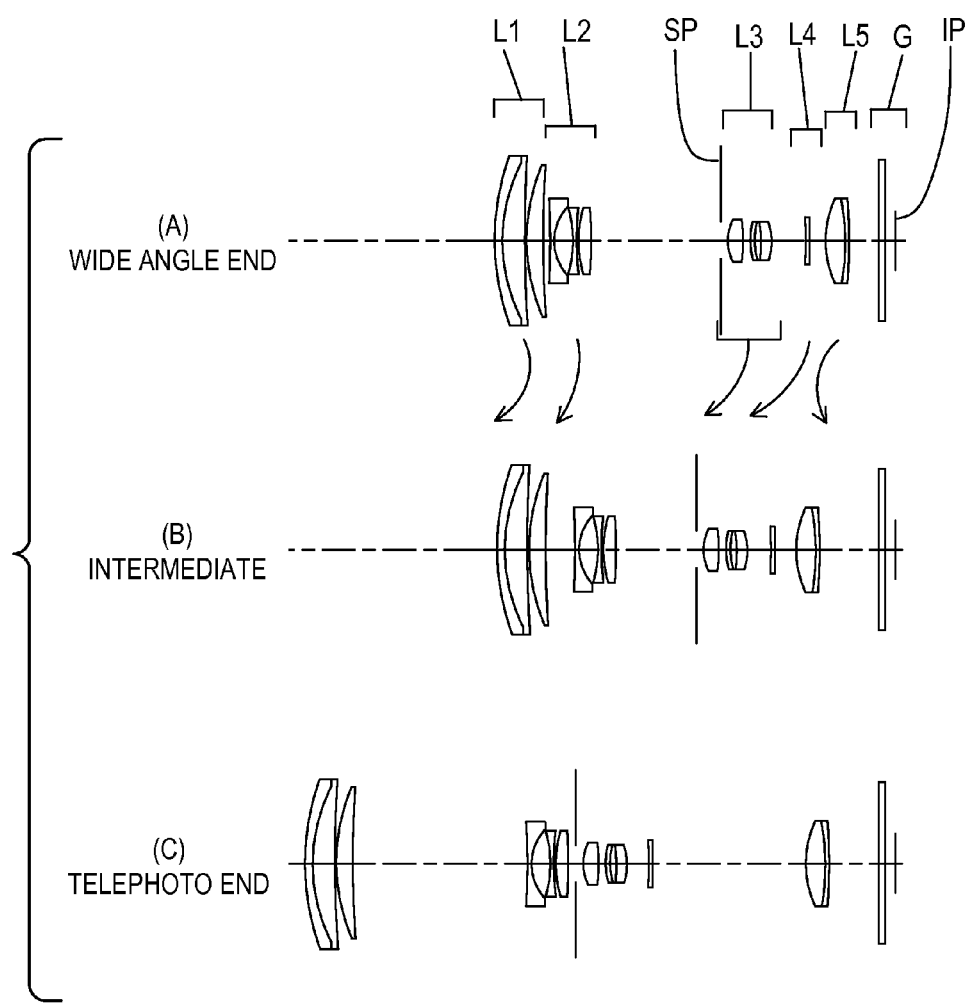
FIG. 1 is a lens cross-sectional view at a wide angle end, at an intermediate zoom position, and at a telephoto end of a zoom lens according to Example 1 of the present invention.
Figure 2A:
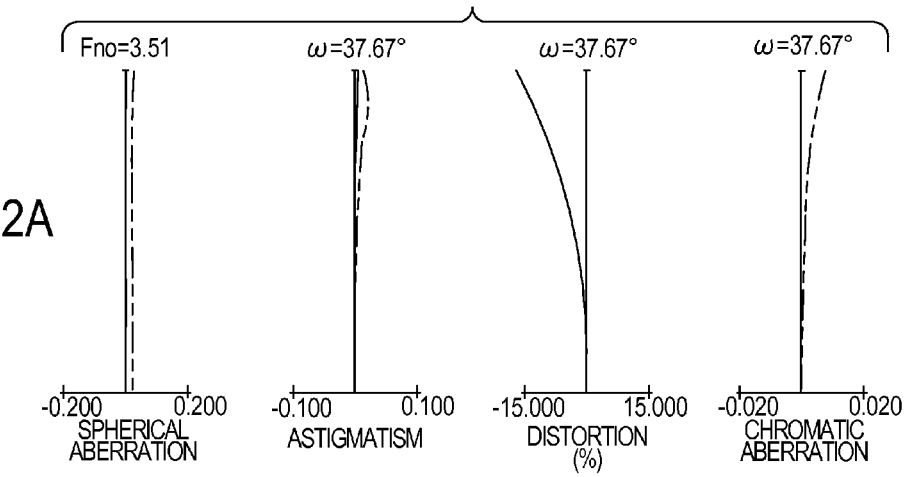
FIG. 2A is a longitudinal aberration diagram at the wide angle end of the zoom lens according to Example 1 of the present invention.
Figure 2B:
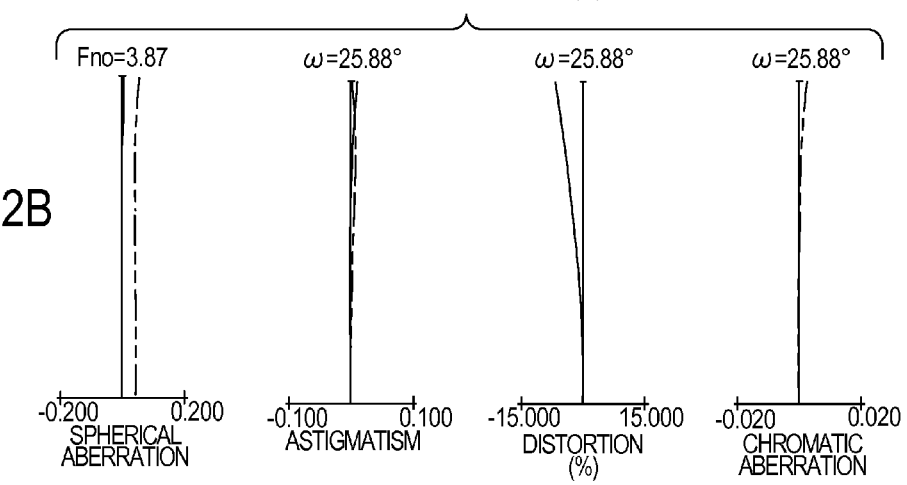
FIG. 2B is a longitudinal aberration diagram at the intermediate zoom position of the zoom lens according to Example 1 of the present invention.
Figure 2C:
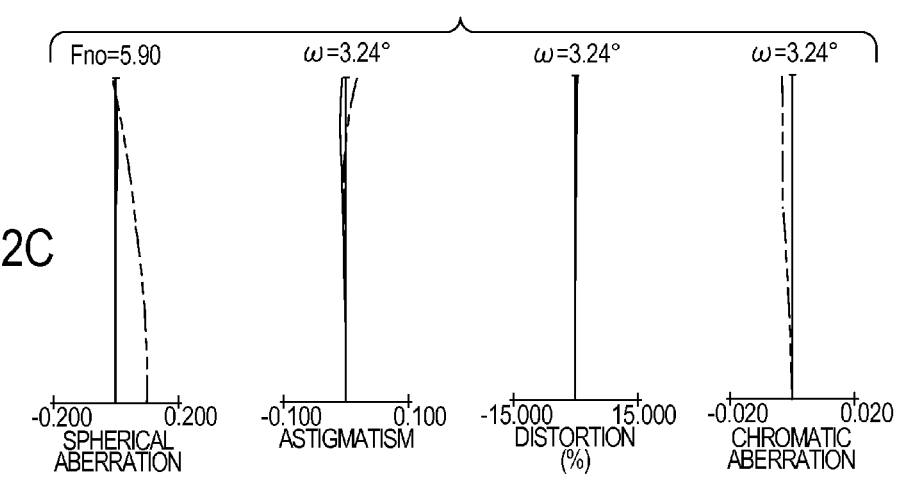
FIG. 2C is a longitudinal aberration diagram at the telephoto end of the zoom lens according to Example 1 of the present invention.
Figure 3A:
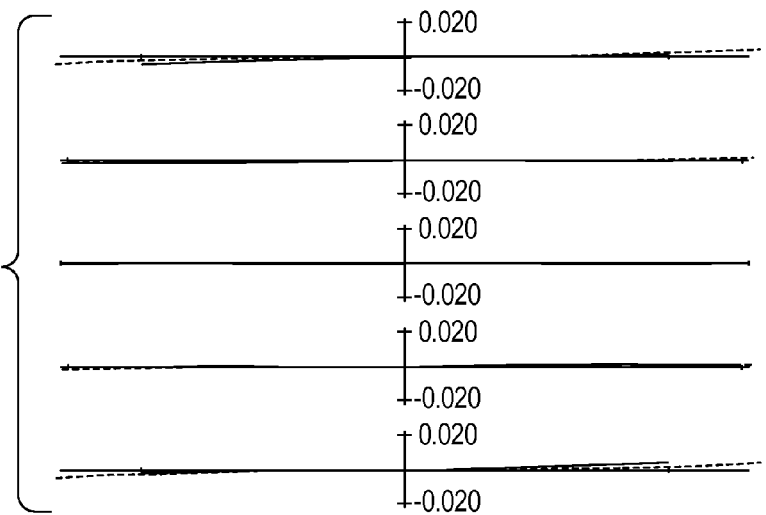
FIG. 3A is a lateral aberration diagram at the wide angle end of the zoom lens according to Example 1 of the present invention.
Figure 3B:
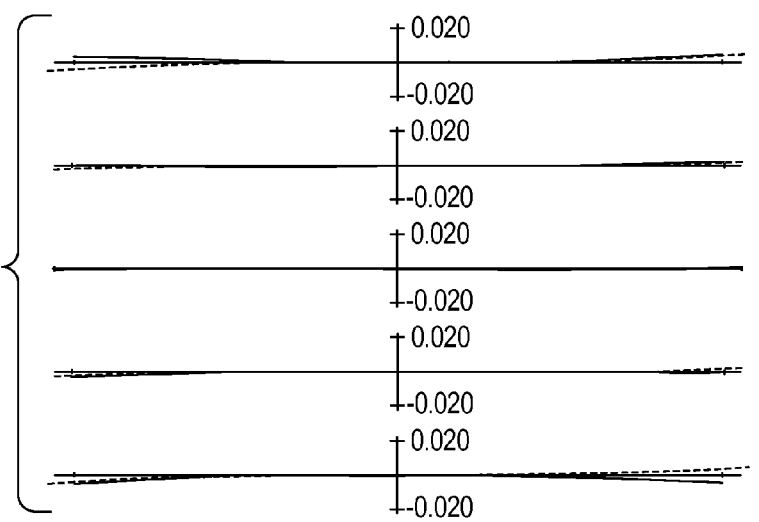
FIG. 3B is a lateral aberration diagram at the intermediate zoom position of the zoom lens according to Example 1 of the present invention.
Figure 3C:
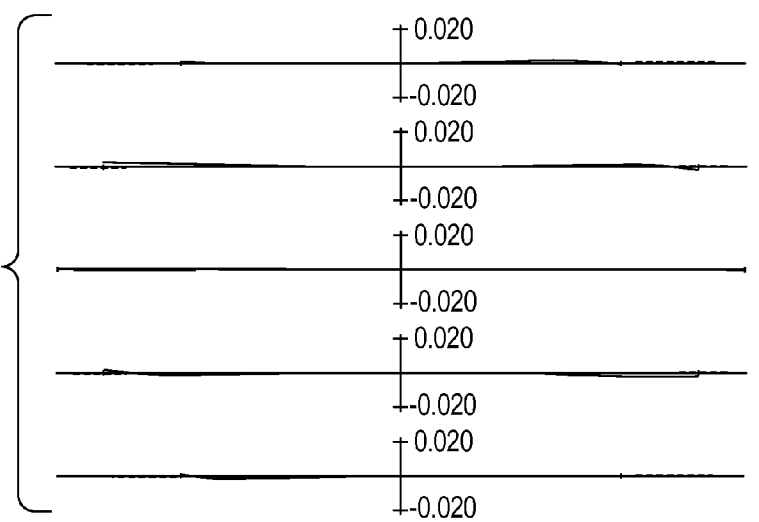
FIG. 3C is a lateral aberration diagram at the telephoto end of the zoom lens according to Example 1 of the present invention.
Figure 4A:
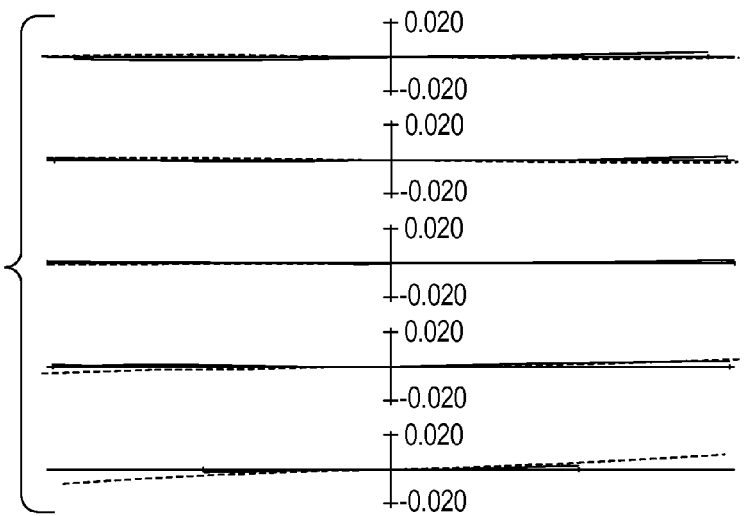
FIG. 4A is a lateral aberration diagram at the wide angle end during an image blur correction in the zoom lens according to Example 1 of the present invention.
Figure 4B:
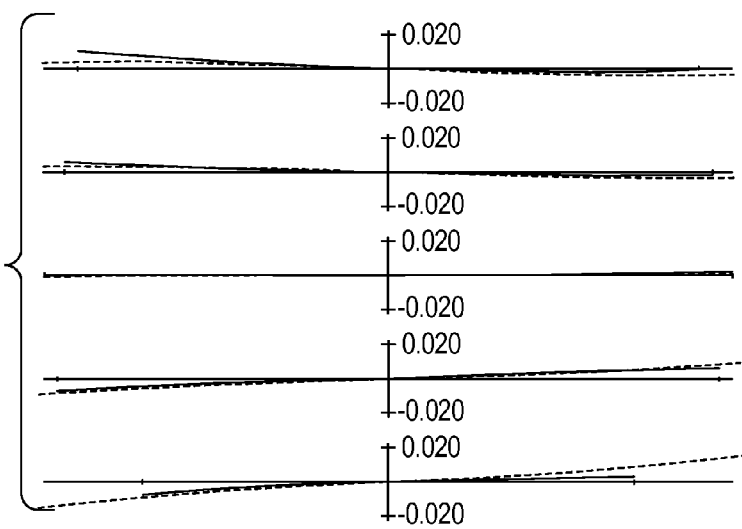
FIG. 4B is a lateral aberration diagram at the intermediate zoom position during the image blur correction in the zoom lens according to Example 1 of the present invention.
Figure 4C:
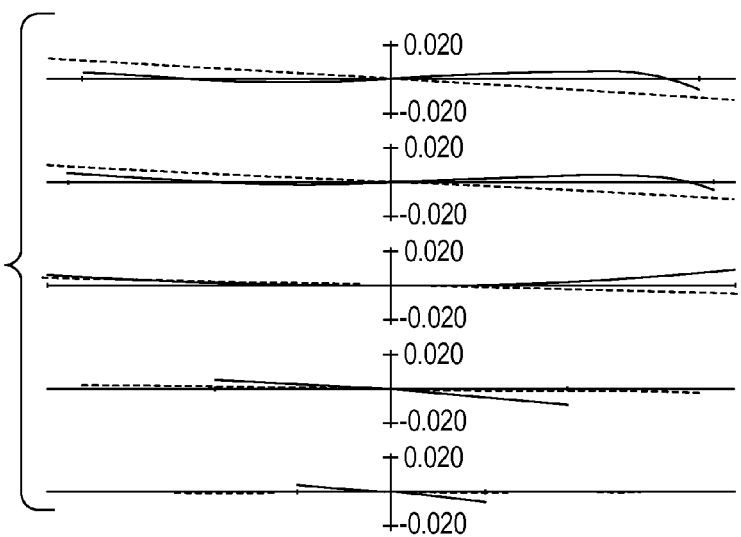
FIG. 4C is a lateral aberration diagram at the telephoto end during the image blur correction in the zoom lens according to Example 1 of the present invention.

Parts (A), (B), and (C) of FIG. 1 are respectively lens cross-sectional views at a wide angle end, at an intermediate zoom position, and at a telephoto end of the zoom lens according to Example 1 of the present invention. FIGS. 2A, 2B, and 2C are respectively longitudinal aberration diagrams at the wide angle end, at the intermediate zoom position, and at the telephoto end of the zoom lens of Example 1 of the present invention. FIGS. 3A, 3B, and 3C are respectively lateral aberration diagrams at the wide angle end, at the intermediate zoom position, and at the telephoto end of the zoom lens of Example 1. FIGS. 2A, 2B, and 2C and FIGS. 3A, 3B, and 3C are each the aberration diagram in a state in which no image blur correction is carried out. FIGS. 4A, 4B, and 4C are respectively lateral aberration diagrams at the wide angle end, at the intermediate zoom position, and at the telephoto end during the image blur correction in the zoom lens of Example 1.

Example 1 is the zoom lens having a zoom ratio of approximately 13.25 and an aperture ratio of from approximately 3.51 to approximately 5.90.

Figure 5:
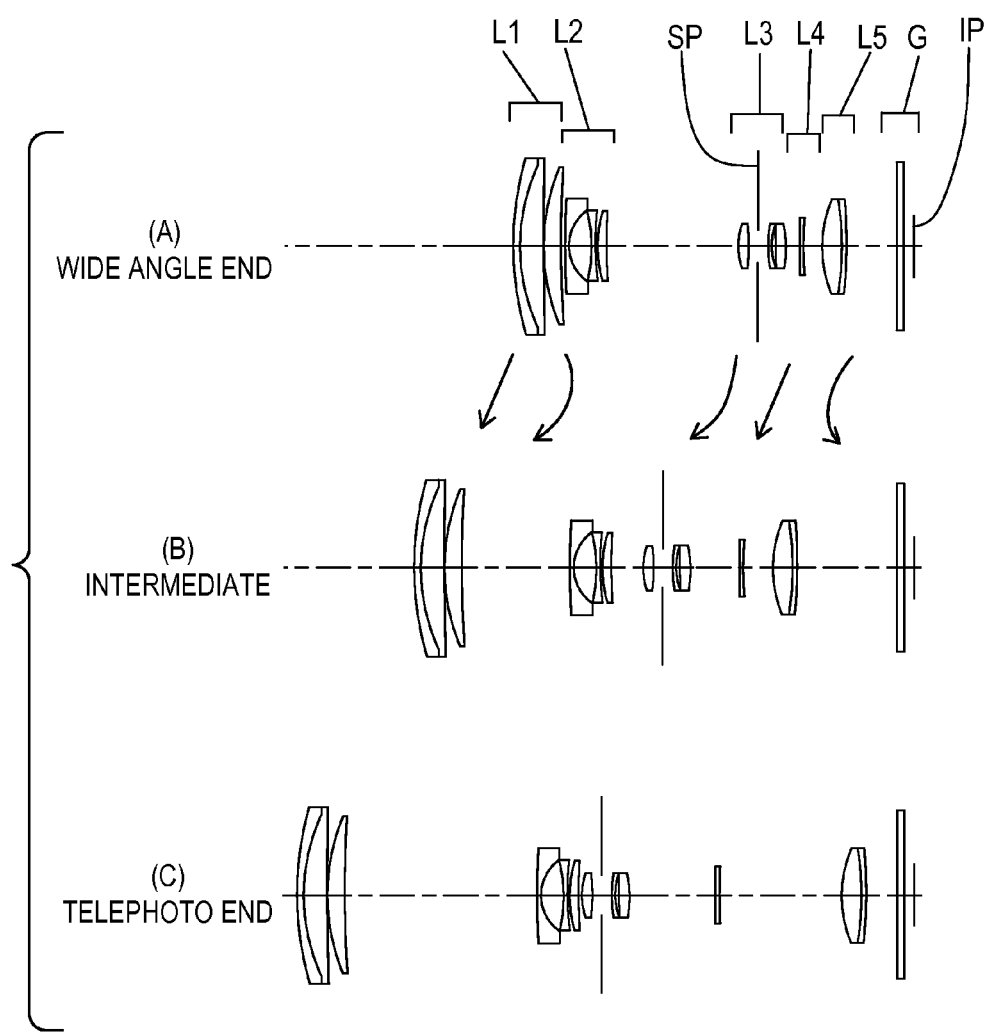
FIG. 5 is a lens cross-sectional view at a wide angle end, at an intermediate zoom position, and at a telephoto end of a zoom lens according to Example 2 of the present invention.
Figure 6A:
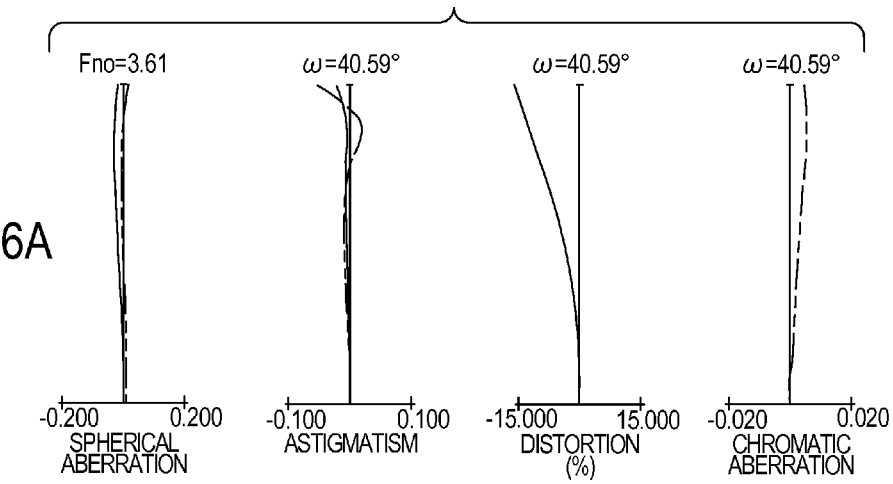
FIG. 6A is a longitudinal aberration diagram at the wide angle end of the zoom lens according to Example 2 of the present invention.
Figure 6B:
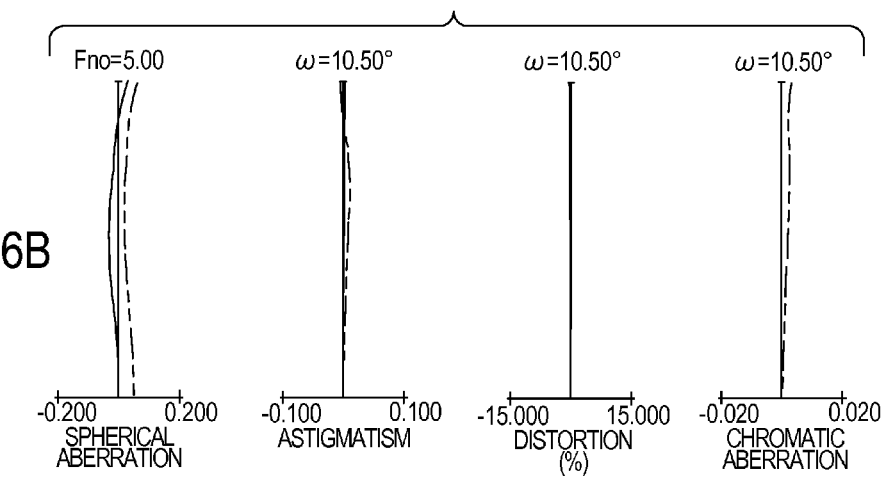
FIG. 6B is a longitudinal aberration diagram at the intermediate zoom position of the zoom lens according to Example 2 of the present invention.
Figure 6C:
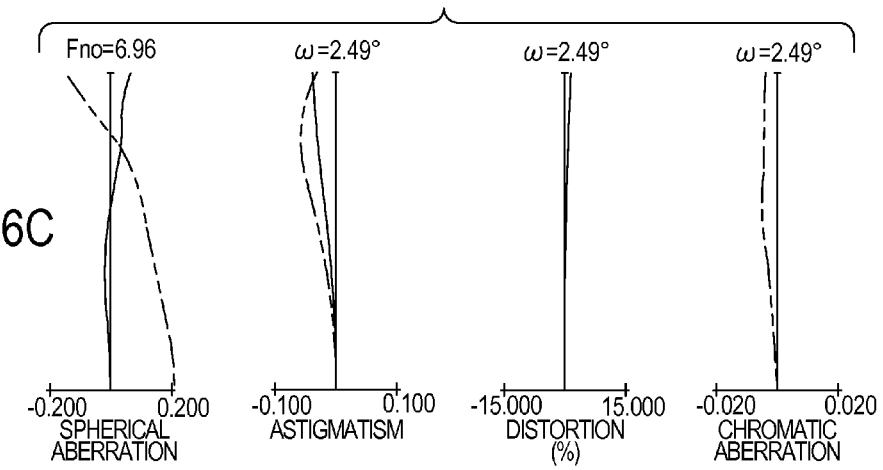
FIG. 6C is a longitudinal aberration diagram at the telephoto end of the zoom lens according to Example 2 of the present invention.
Figure 8A:
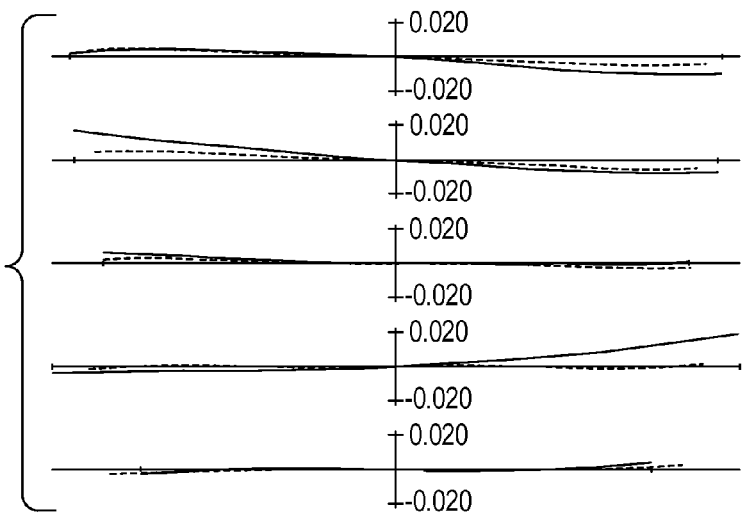
FIG. 8A is a lateral aberration diagram at the wide angle end during an image blur correction in the zoom lens according to Example 2 of the present invention.
Figure 8B:
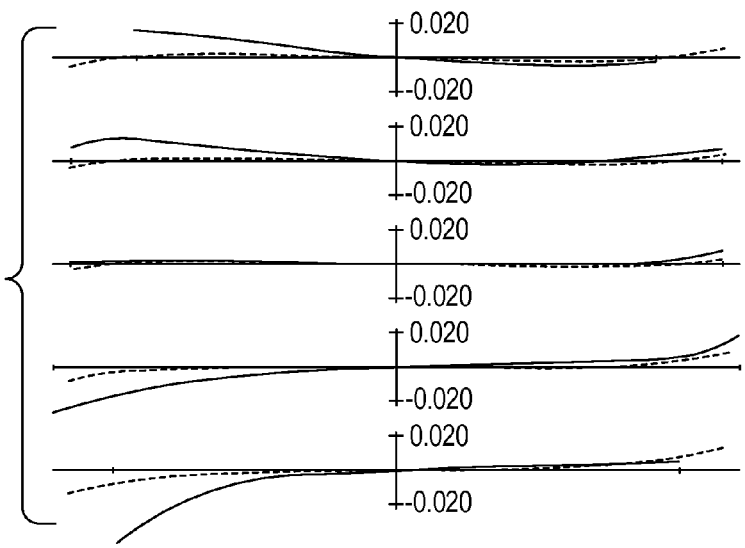
FIG. 8B is a lateral aberration diagram at the intermediate zoom position during the image blur correction in the zoom lens according to Example 2 of the present invention.
Figure 8C:
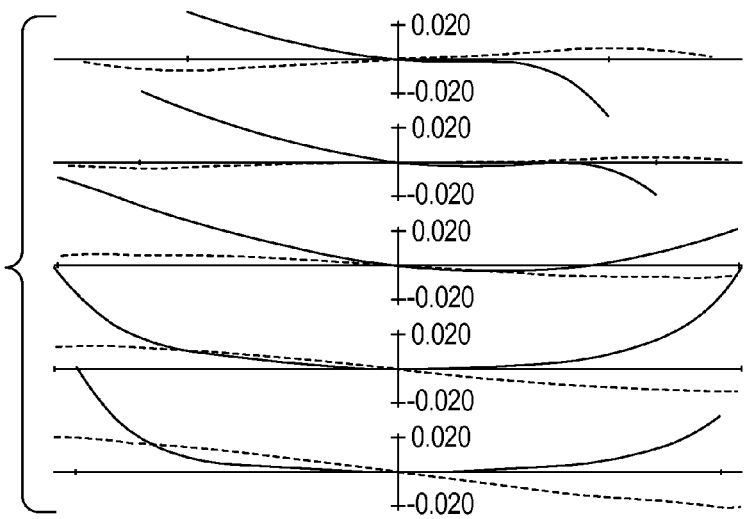
FIG. 8C is a lateral aberration diagram at the telephoto end during the image blur correction in the zoom lens according to Example 2 of the present invention.

Parts (A), (B), and (C) of FIG. 5 are respectively lens cross-sectional views at a wide angle end, at an intermediate zoom position, and at a telephoto end of the zoom lens according to Example 2 of the present invention. FIGS. 6A, 6B, and 6C are respectively longitudinal aberration diagrams at the wide angle end, at the intermediate zoom position, and at the telephoto end of the zoom lens of Example 2 of the present invention. FIGS. 7A, 7B, and 7C are respectively lateral aberration diagrams at the wide angle end, at the intermediate zoom position, and at the telephoto end of the zoom lens of Example 2. FIGS. 6A, 6B, and 6C and FIGS. 7A, 7B, and 7C are each the aberration diagram in a state in which no image blur correction is carried out. FIGS. 8A, 8B, and 8C are respectively lateral aberration diagrams at the wide angle end, at the intermediate zoom position, and at the telephoto end during the image blur correction in the zoom lens of Example 2.

Example 2 is the zoom lens having a zoom ratio of approximately 18.93 and an aperture ratio of from approximately 3.61 to approximately 6.96.

Figure 9:
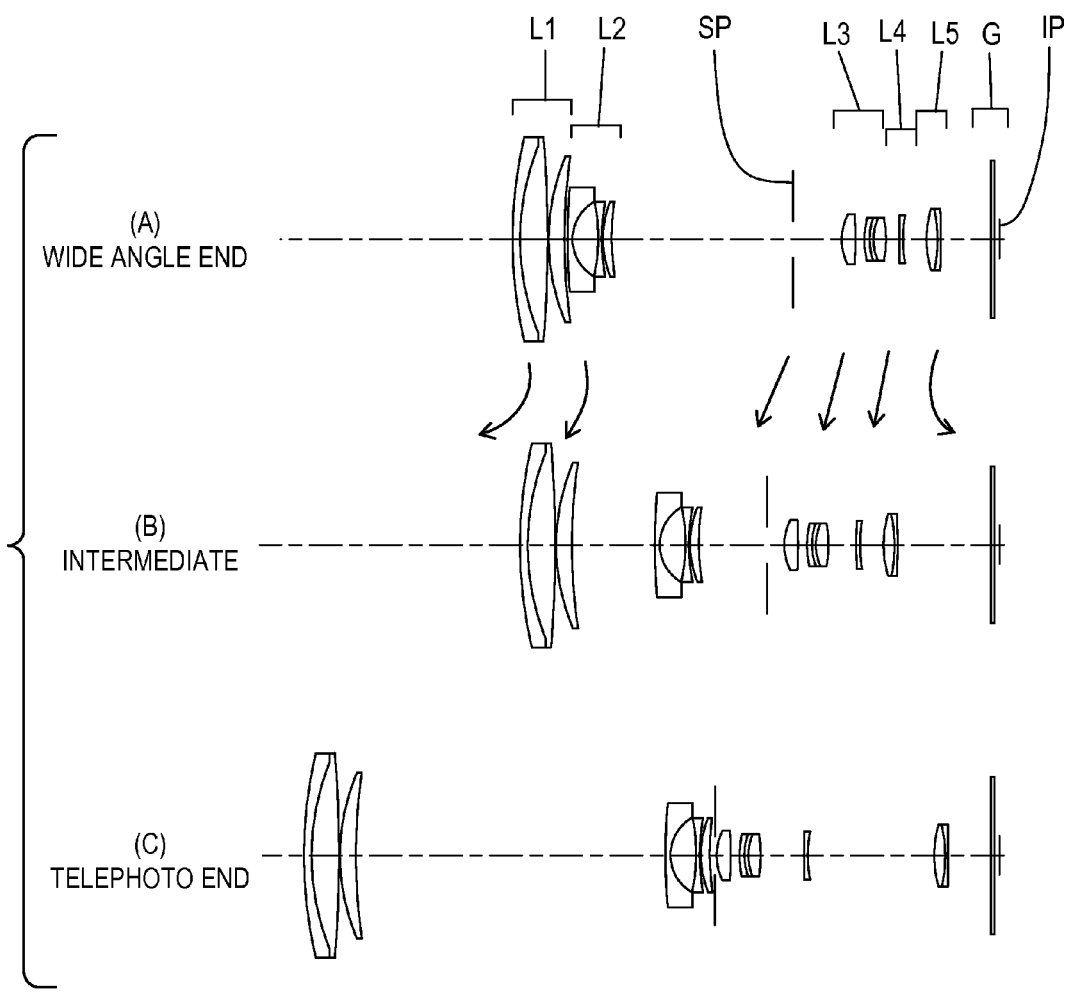
FIG. 9 is a lens cross-sectional view at a wide angle end, at an intermediate zoom position, and at a telephoto end of a zoom lens according to Example 3 of the present invention.
Figure 10A:
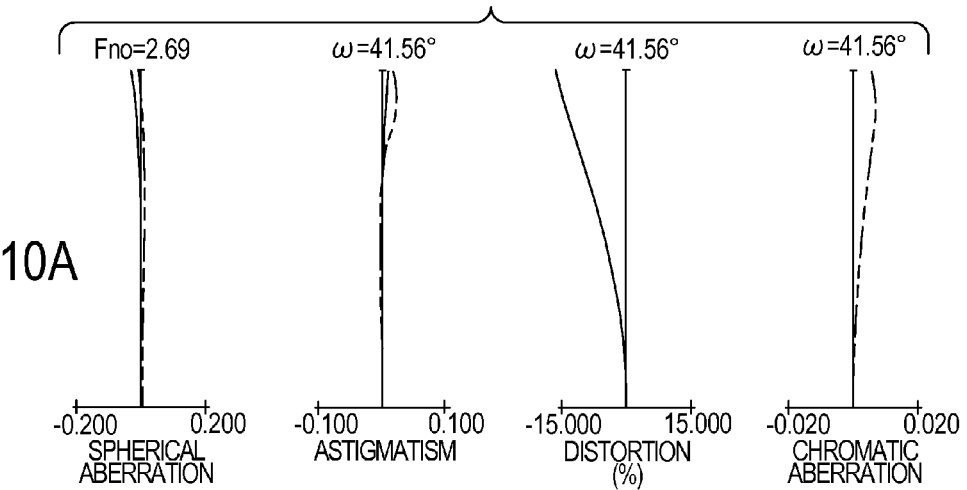
FIG. 10A is a longitudinal aberration diagram at the wide angle end of the zoom lens according to Example 3 of the present invention.
Figure 10B:
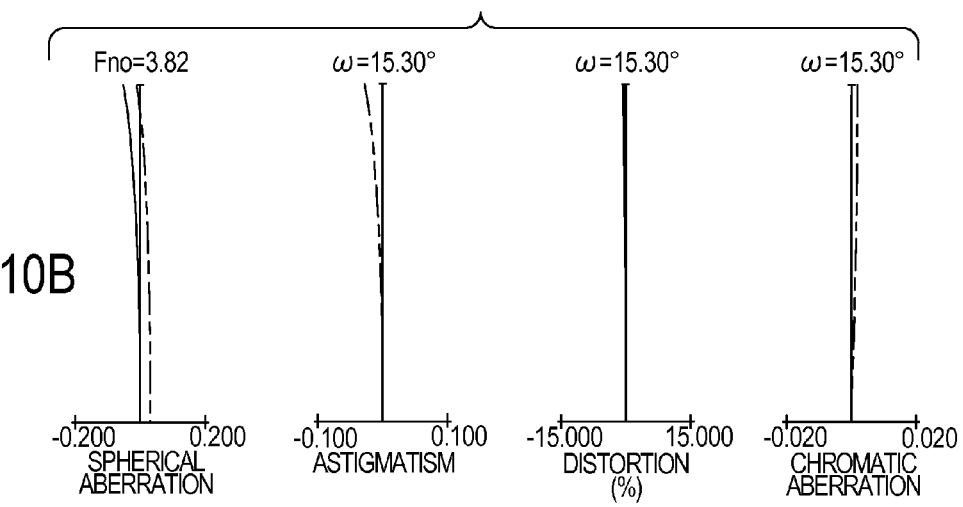
FIG. 10B is a longitudinal aberration diagram at the intermediate zoom position of the zoom lens according to Example 3 of the present invention.
Figure 10C:
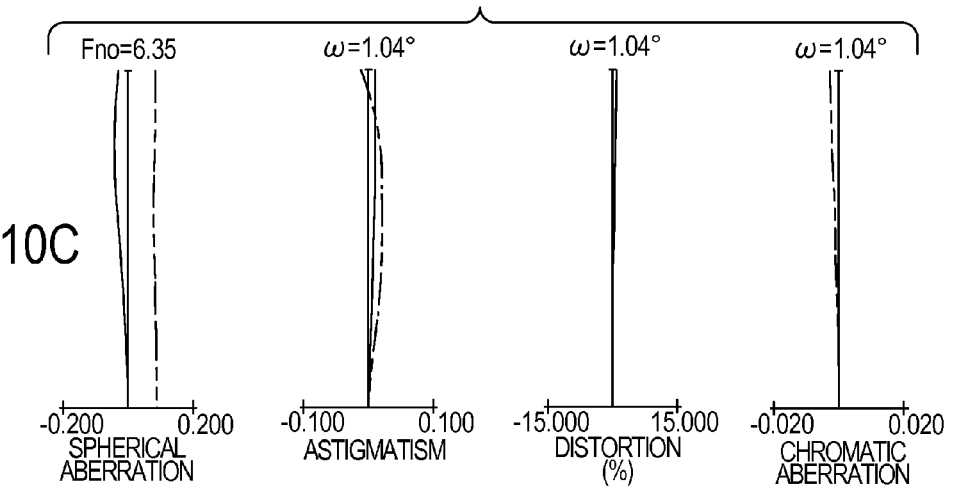
FIG. 10C is a longitudinal aberration diagram at the telephoto end of the zoom lens according to Example 3 of the present invention.
Figure 11A:
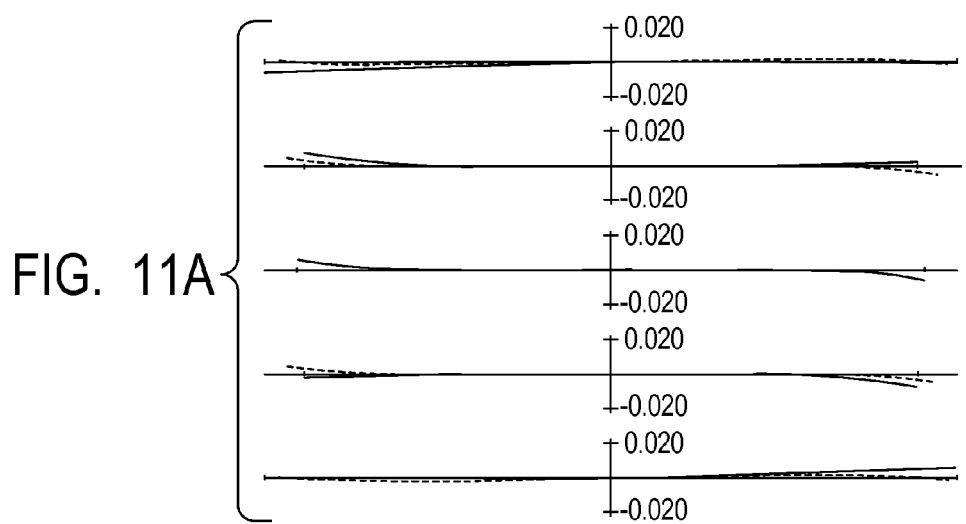
FIG. 11A is a lateral aberration diagram at the wide angle end of the zoom lens according to Example 3 of the present invention.
Figure 11B:
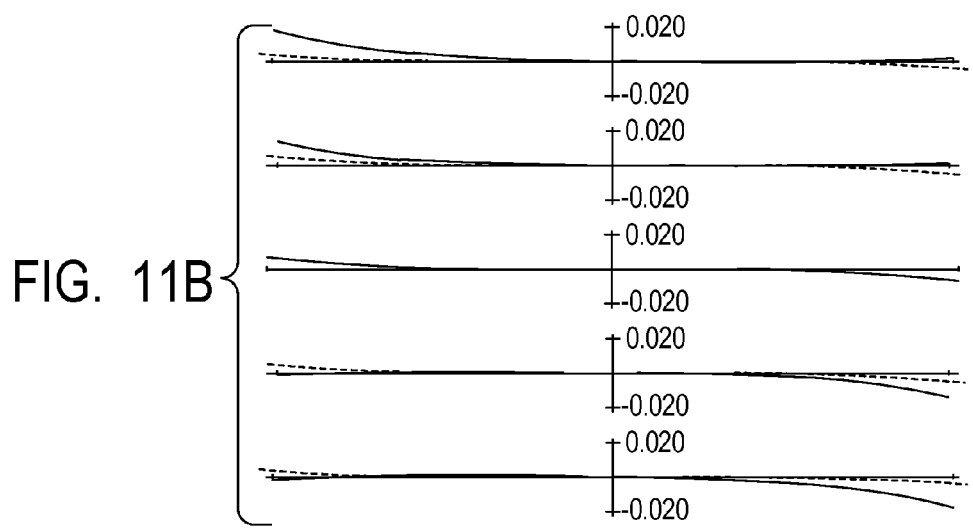
FIG. 11B is a lateral aberration diagram at the intermediate zoom position of the zoom lens according to Example 3 of the present invention.
Figure 11C:
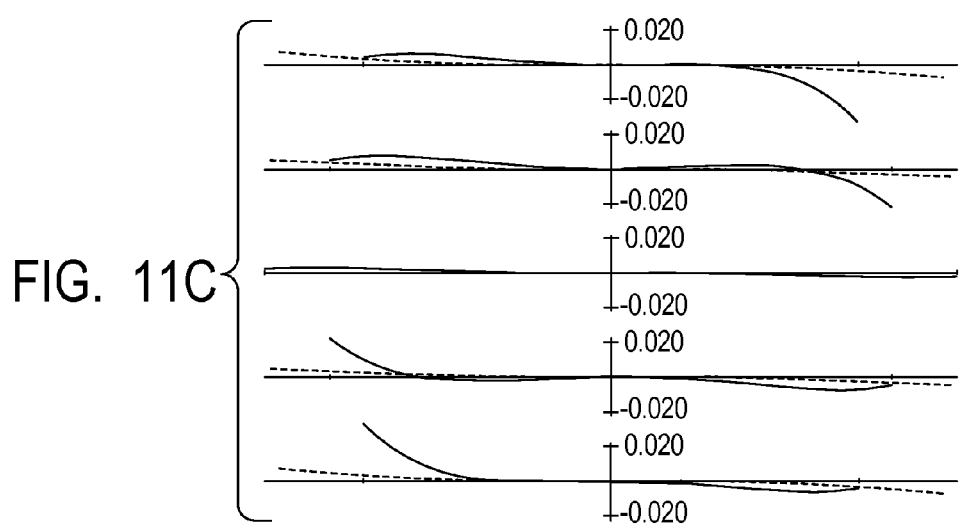
FIG. 11C is a lateral aberration diagram at the telephoto end of the zoom lens according to Example 3 of the present invention.
Figure 12A:
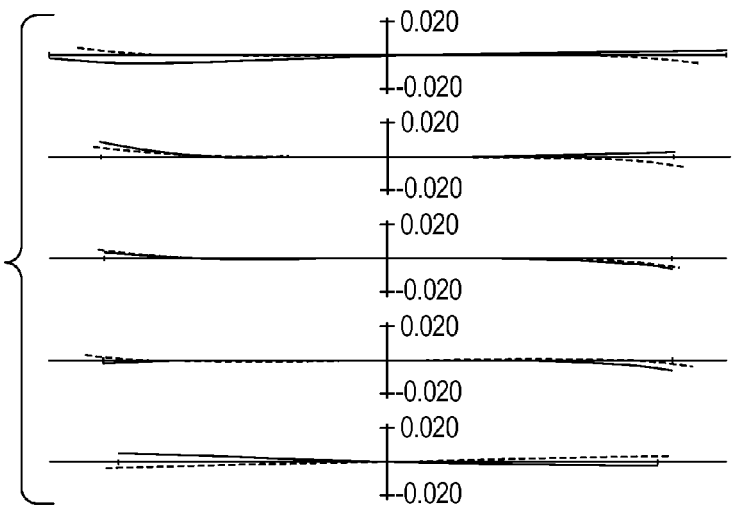
FIG. 12A is a lateral aberration diagram at the wide angle end during an image blur correction in the zoom lens according to Example 3 of the present invention.
Figure 12B:
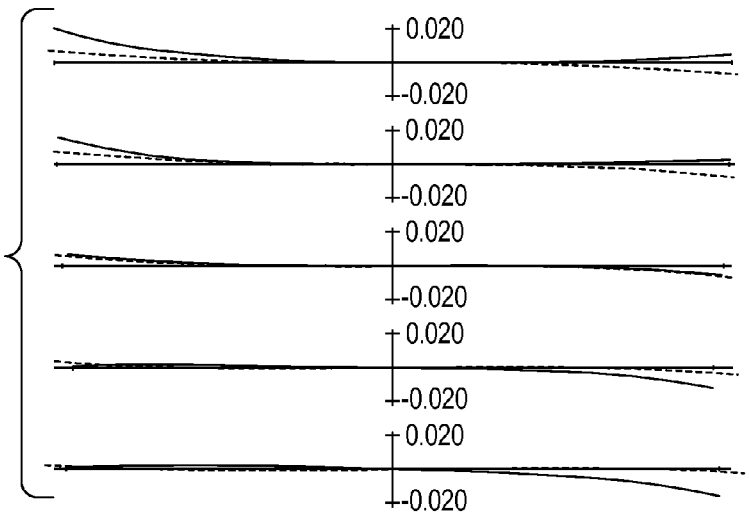
FIG. 12B is a lateral aberration diagram at the intermediate zoom position during the image blur correction in the zoom lens according to Example 3 of the present invention.
Figure 12C:
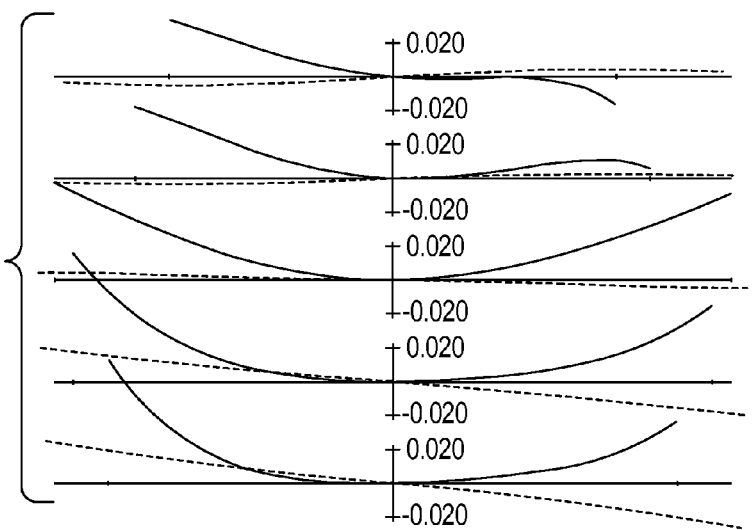
FIG. 12C is a lateral aberration diagram at the telephoto end during the image blur correction in the zoom lens according to Example 3 of the present invention.

Parts (A), (B), and (C) of FIG. 9 are respectively lens cross-sectional views at a wide angle end, at an intermediate zoom position, and at a telephoto end of the zoom lens according to Example 3 of the present invention. FIGS. 10A, 10B, and 10C are respectively longitudinal aberration diagrams at the wide angle end, at the intermediate zoom position, and at the telephoto end of the zoom lens of Example 3 of the present invention. FIGS. 11A, 11B, and 11C are respectively lateral aberration diagrams at the wide angle end, at the intermediate zoom position, and at the telephoto end of the zoom lens of Example 3. FIGS. 10A, 10B, and 10C and FIGS. 11A, 11B, and 11C are each the aberration diagram in a state in which no image blur correction is carried out. FIGS. 12A, 12B, and 12C are respectively lateral aberration diagrams at the wide angle end, at the intermediate zoom position, and at the telephoto end during the image blur correction in the zoom lens of Example 3.

Example 3 is the zoom lens having a zoom ratio of approximately 47.51 and an aperture ratio of from approximately 2.69 to approximately 6.35.

Figure 13:
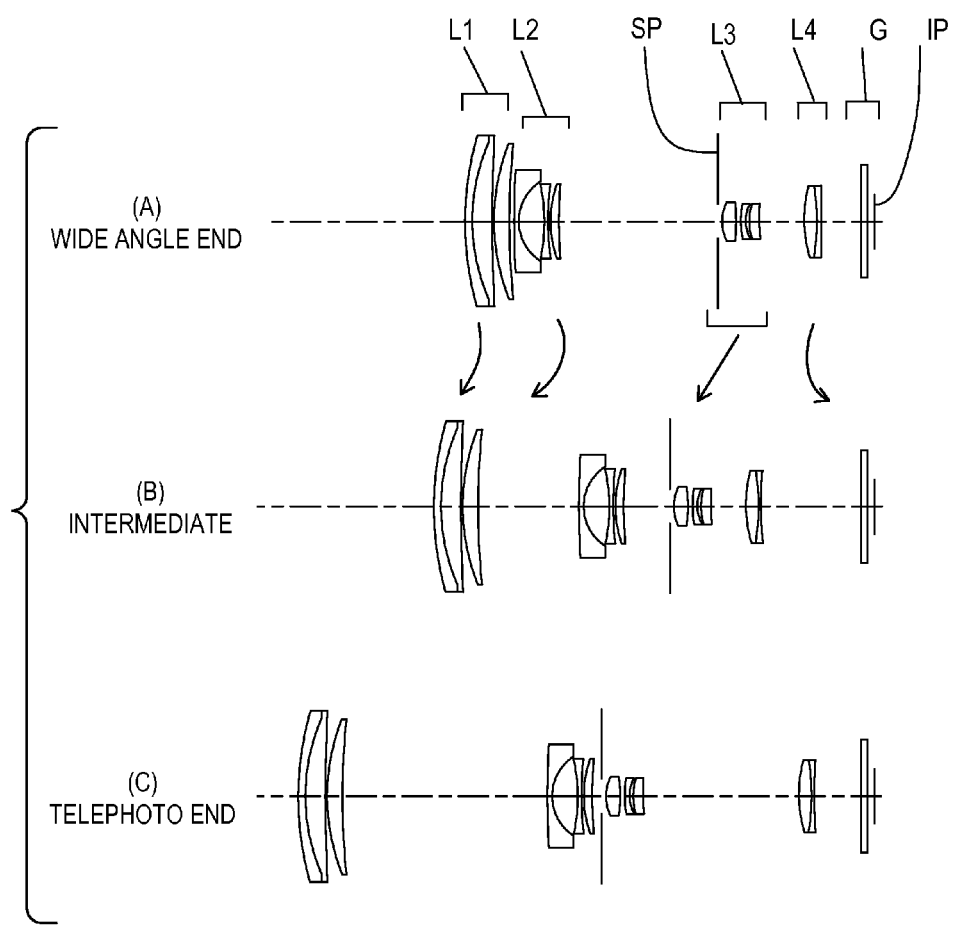
FIG. 13 is a lens cross-sectional view at a wide angle end, at an intermediate zoom position, and at a telephoto end of a zoom lens according to Example 4 of the present invention.
Figure 14A:
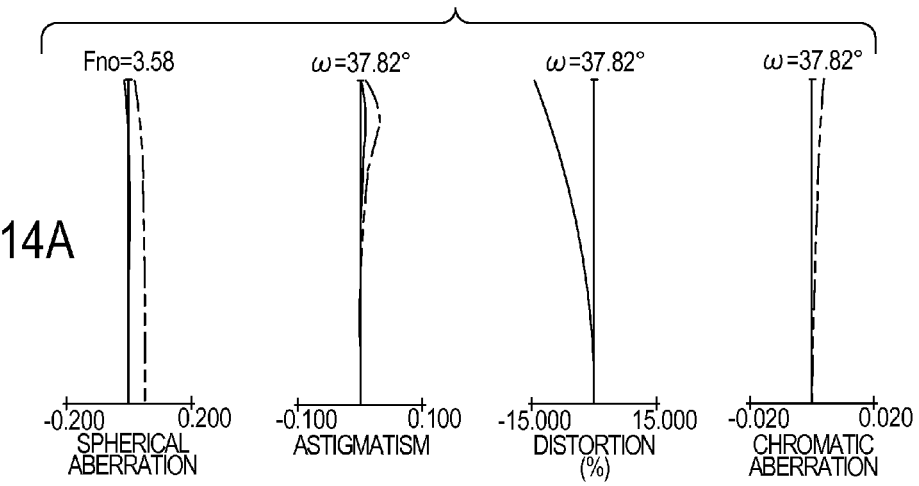
FIG. 14A is a longitudinal aberration diagram at the wide angle end of the zoom lens according to Example 4 of the present invention.
Figure 14B:
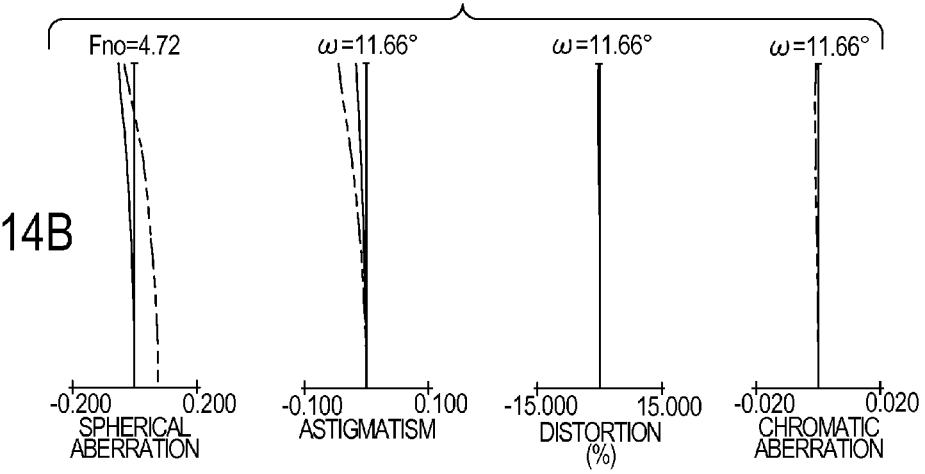
FIG. 14B is a longitudinal aberration diagram at the intermediate zoom position of the zoom lens according to Example 4 of the present invention.
Figure 14C:
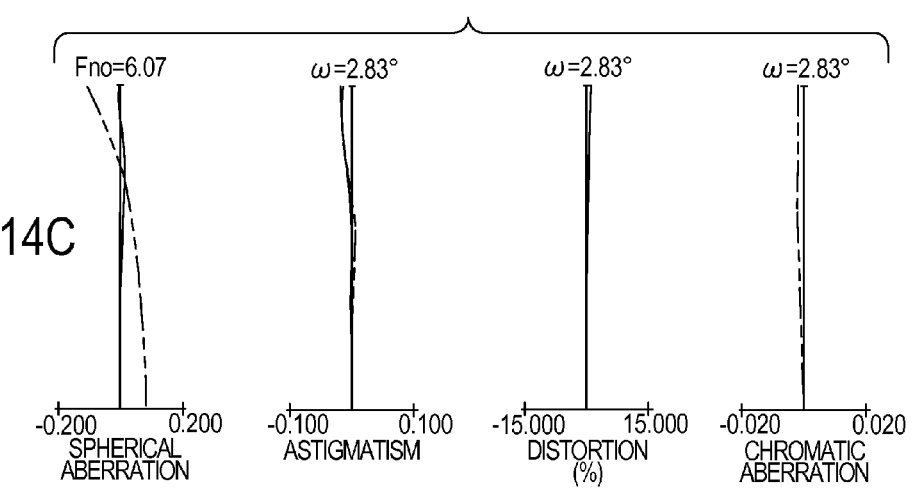
FIG. 14C is a longitudinal aberration diagram at the telephoto end of the zoom lens according to Example 4 of the present invention.
Figure 16A:
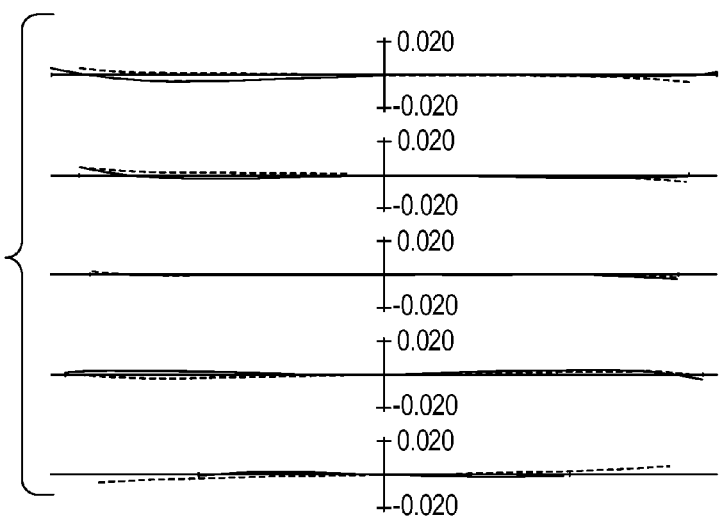
FIG. 16A is a lateral aberration diagram at the wide angle end during an image blur correction in the zoom lens according to Example 4 of the present invention.
Figure 16B:
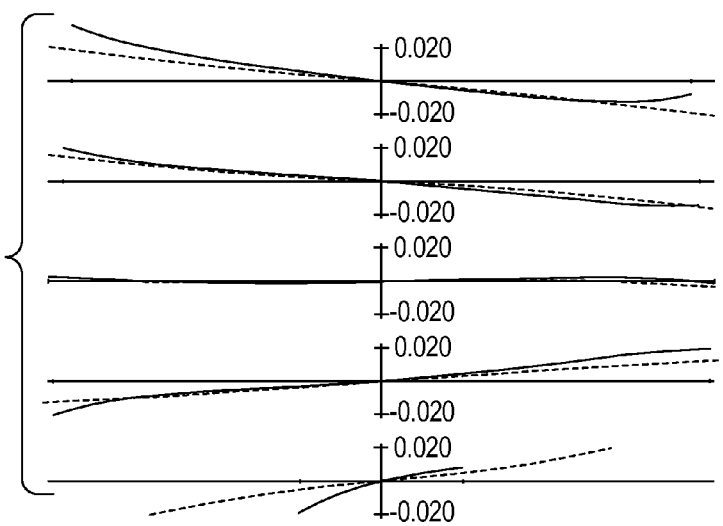
FIG. 16B is a lateral aberration diagram at the intermediate zoom position during the image blur correction in the zoom lens according to Example 4 of the present invention.
Figure 16C:
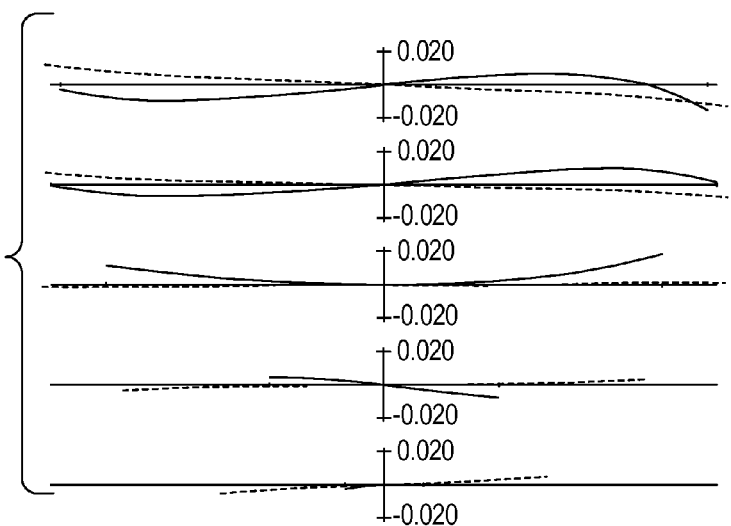
FIG. 16C is a lateral aberration diagram at the telephoto end during the image blur correction in the zoom lens according to Example 4 of the present invention.

Parts (A), (B), and (C) of FIG. 13 are respectively lens cross-sectional views at a wide angle end, at an intermediate zoom position, and at a telephoto end of the zoom lens according to Example 4 of the present invention. FIGS. 14A, 14B, and 14C are respectively longitudinal aberration diagrams at the wide angle end, at the intermediate zoom position, and at the telephoto end of the zoom lens of Example 4 of the present invention. FIGS. 15A, 15B, and 15C are respectively lateral aberration diagrams at the wide angle end, at the intermediate zoom position, and at the telephoto end of the zoom lens of Example 4. FIGS. 14A, 14B, and 14C and FIGS. 15A, 15B, and 15C are each the aberration diagram in a state in which no image blur correction is carried out. FIGS. 16A, 16B, and 16C are respectively lateral aberration diagrams at the wide angle end, at the intermediate zoom position, and at the telephoto end during the image blur correction in the zoom lens of Example 4.

Example 4 is the zoom lens having a zoom ratio of approximately 15.12 and an aperture ratio of from approximately 3.58 to approximately 6.07.

Figure 17:
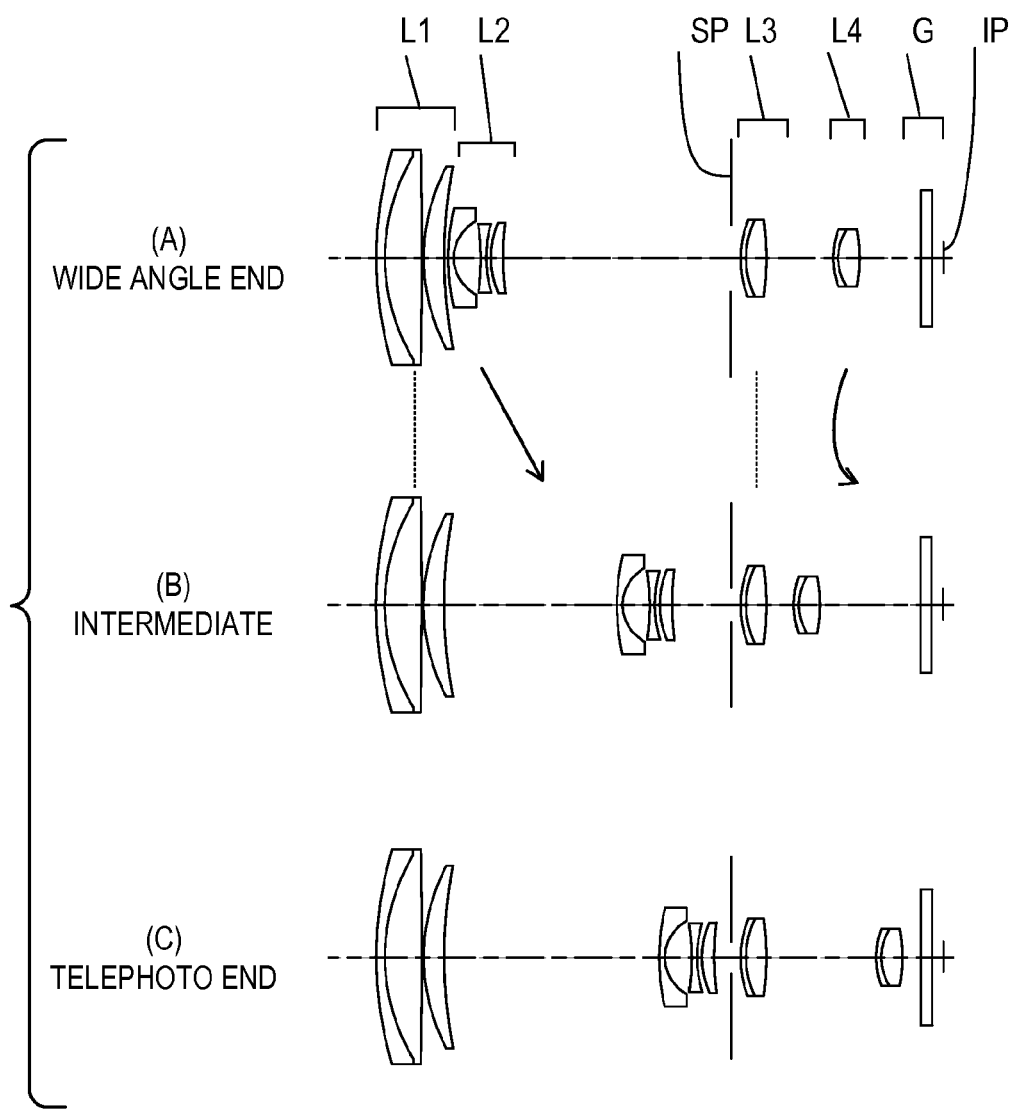
FIG. 17 is a lens cross-sectional view at a wide angle end, at an intermediate zoom position, and at a telephoto end of a zoom lens according to Example 5 of the present invention.
Figure 18A:
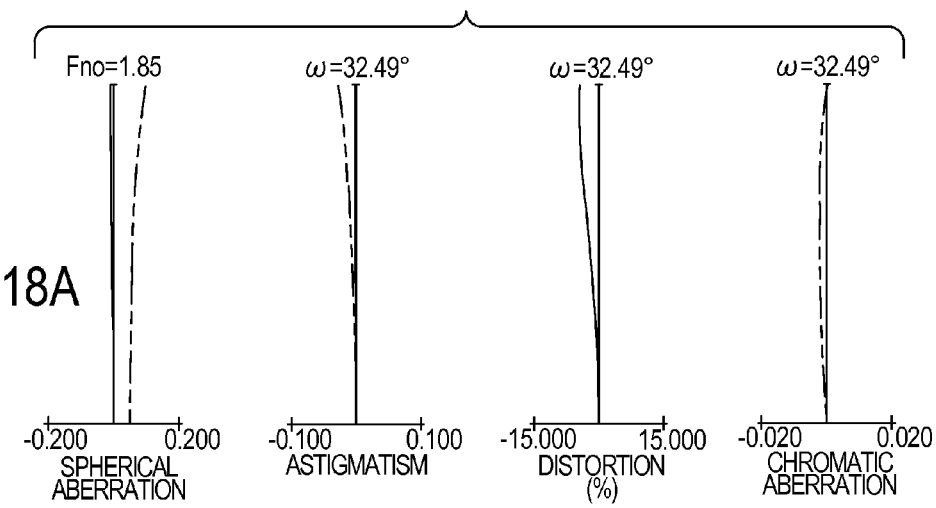
FIG. 18A is a longitudinal aberration diagram at the wide angle end of the zoom lens according to Example 5 of the present invention.
Figure 18B:
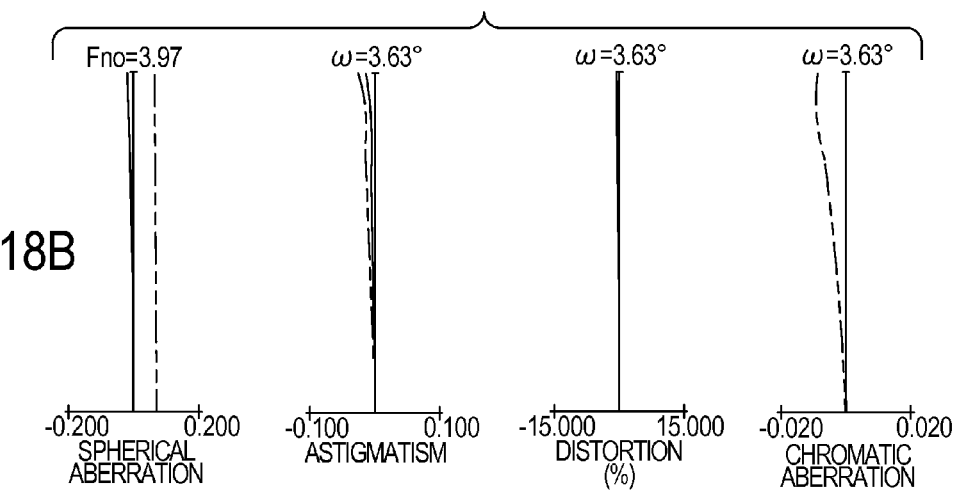
FIG. 18B is a longitudinal aberration diagram at the intermediate zoom position of the zoom lens according to Example 5 of the present invention.
Figure 18C:
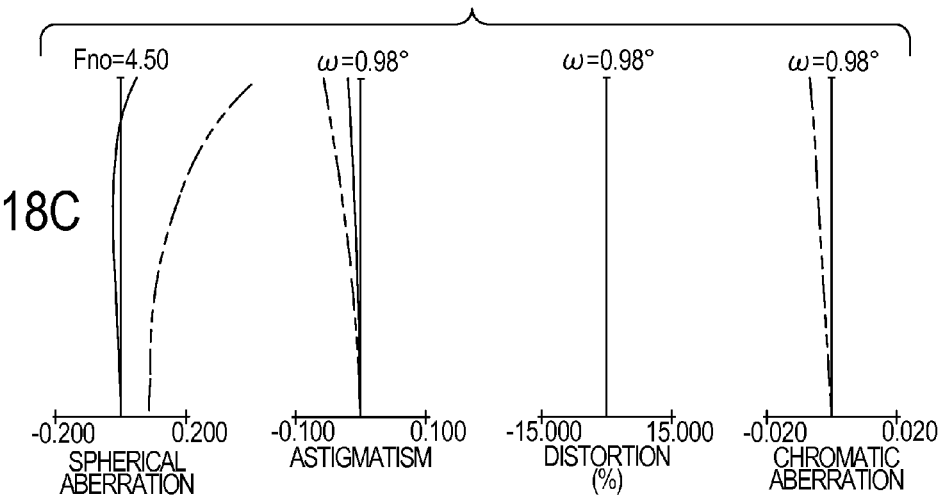
FIG. 18C is a longitudinal aberration diagram at the telephoto end of the zoom lens according to Example 5 of the present invention.
Figure 19A:
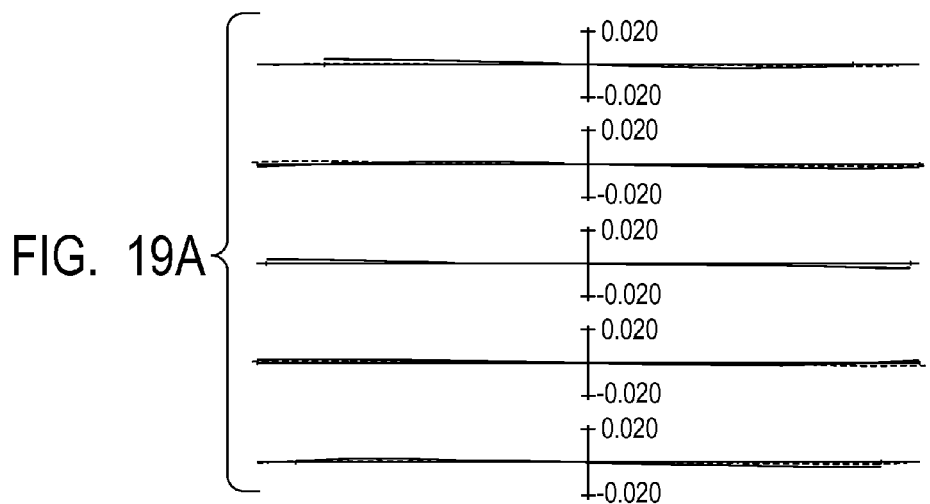
FIG. 19A is a lateral aberration diagram at the wide angle end of the zoom lens according to Example 5 of the present invention.
Figure 19B:
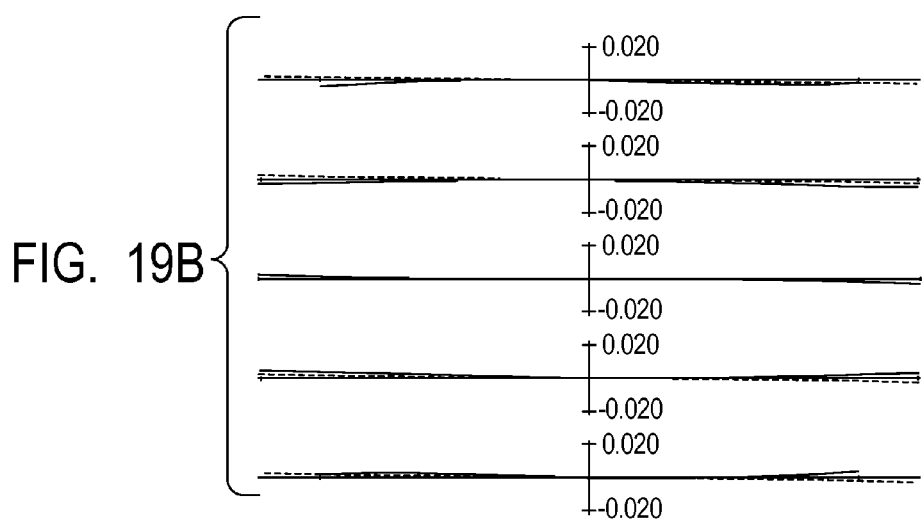
FIG. 19B is a lateral aberration diagram at the intermediate zoom position of the zoom lens according to Example 5 of the present invention.
Figure 19C:
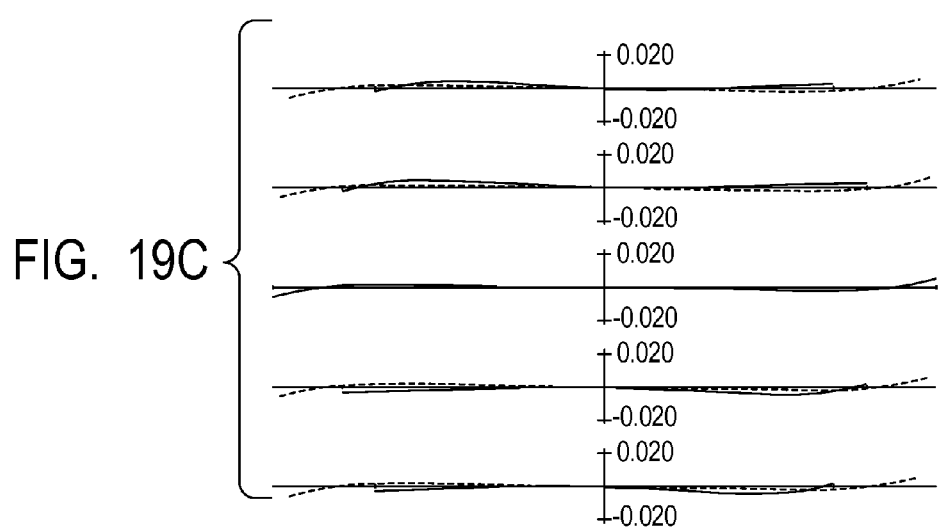
FIG. 19C is a lateral aberration diagram at the telephoto end of the zoom lens according to Example 5 of the present invention.
Figure 20A:
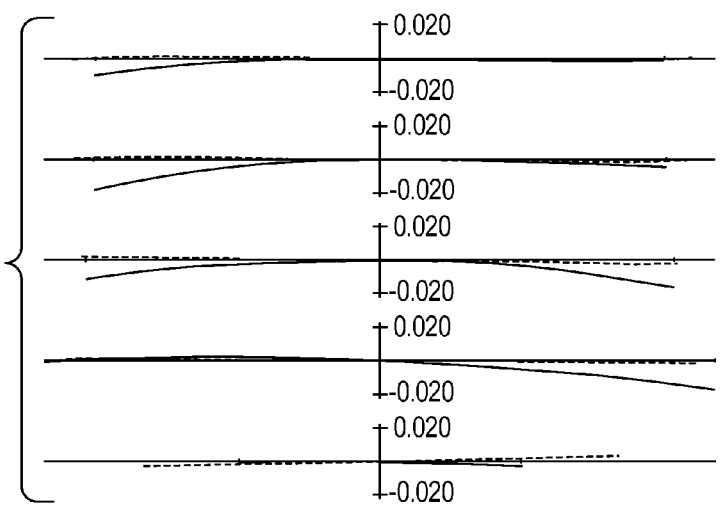
FIG. 20A is a lateral aberration diagram at the wide angle end during an image blur correction in the zoom lens according to Example 5 of the present invention.
Figure 20B:
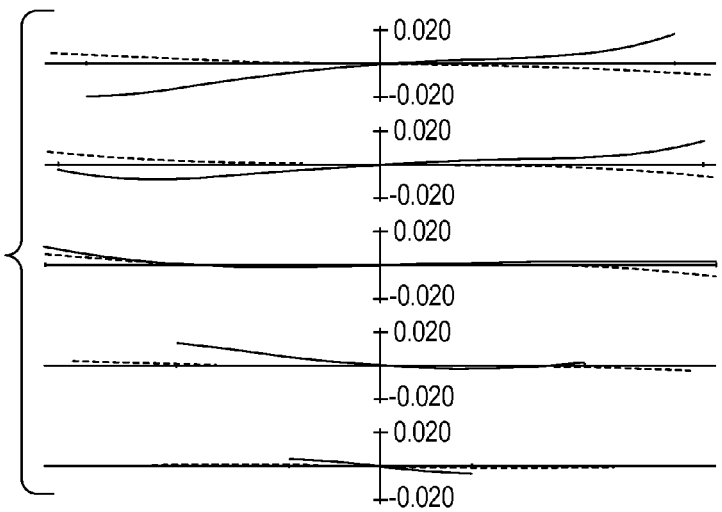
FIG. 20B is a lateral aberration diagram at the intermediate zoom position during the image blur correction in the zoom lens according to Example 5 of the present invention.
Figure 20C:
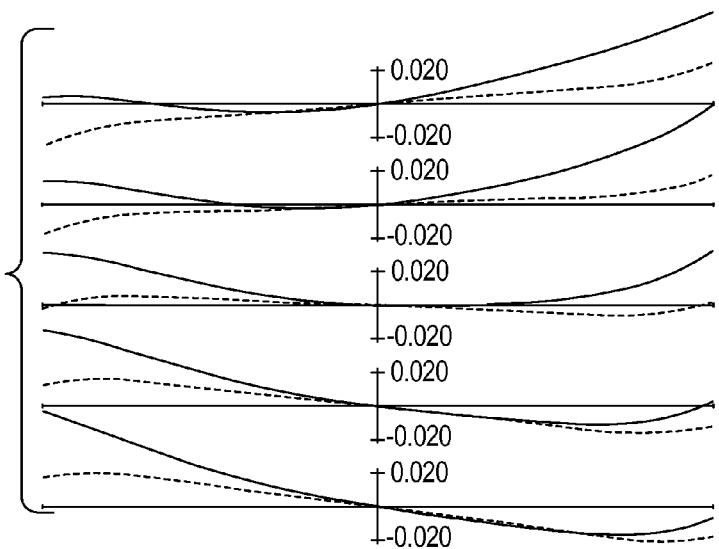
FIG. 20C is a lateral aberration diagram at the telephoto end during the image blur correction in the zoom lens according to Example 5 of the present invention.

Parts (A), (B), and (C) of FIG. 17 are respectively lens cross-sectional views at a wide angle end, at an intermediate zoom position, and at a telephoto end of the zoom lens according to Example 5 of the present invention. FIGS. 18A, 18B, and 18C are respectively longitudinal aberration diagrams at the wide angle end, at the intermediate zoom position, and at the telephoto end of the zoom lens of Example 5 of the present invention. FIGS. 19A, 19B, and 19C are respectively lateral aberration diagrams at the wide angle end, at the intermediate zoom position, and at the telephoto end of the zoom lens of Example 5. FIGS. 18A, 18B, and 18C and FIGS. 19A, 19B, and 19C are each the aberration diagram in a state in which no image blur correction is carried out. FIGS. 20A, 20B, and 20C are respectively lateral aberration diagrams at the wide angle end, at the intermediate zoom position, and at the telephoto end during the image blur correction in the zoom lens of Example 5.

Example 5 is the zoom lens having a zoom ratio of approximately 31.81 and an aperture ratio of from approximately 1.85 to approximately 4.50.

Figure 21:
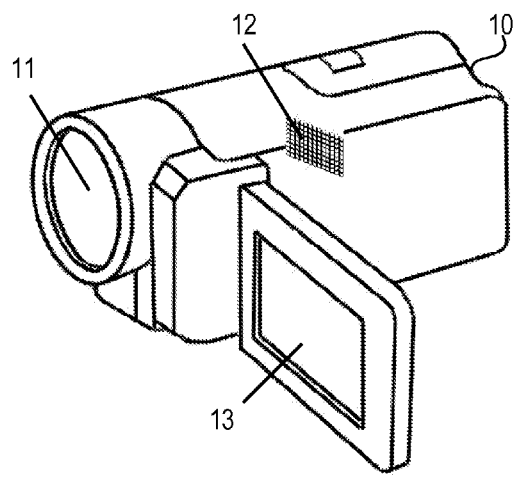
FIG. 21 is a schematic view illustrating a main part of an image pickup apparatus of the present invention.
Figure 22:
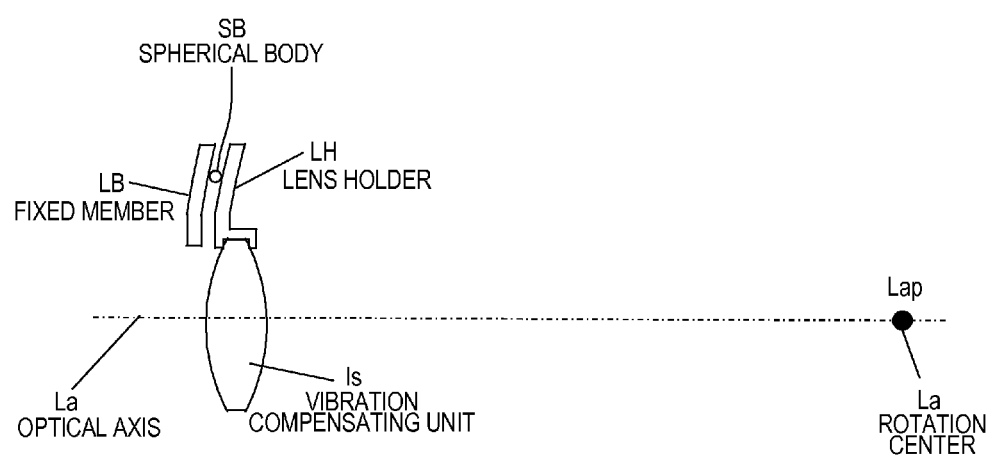
FIG. 22 is an explanatory view of a tilt mechanism of a tilt image stabilizing unit of the present invention.

FIG. 21 is a schematic view illustrating a main part of an image pickup apparatus of the present invention. FIG. 22 is an explanatory view during an image blur correction by a tilt image stabilizing unit of the present invention.

The zoom lens of the present invention is used for an image pickup apparatus such as a digital camera, a video camera, or a silver-halide film camera. In the lens cross sections, the left side is a front side (object side or magnification side) while the right side is a rear side (image side or reduction side). In the lens cross sections, symbol i indicates an order of lens units from the object side to the image side, and symbol Li represents an i-th lens unit.

In the lens cross section of each example, the zoom lens includes a first lens unit L1 having a positive refractive power, a second lens unit L2 having a negative refractive power, a third lens unit L3 having a positive refractive power, a fourth lens unit L4 having one of a positive refractive power and a negative refractive power, and a fifth lens unit L5 having a positive refractive power. An F number determination member (hereinafter referred to also as an "aperture stop") SP has a function of aperture stop for determining (limiting) a maximum F number (Fno) light flux.

An optical block G corresponds to an optical filter, a face plate, a quartz low-pass filter, an infrared cut filter, or the like. As an image plane IP, an imaging plane of an image pickup element (photo-electric conversion element) such as a CCD sensor or a CMOS sensor is arranged when the zoom lens is used as a photographing optical system for use in a video camera or a digital still camera. Alternatively, a photosensitive surface corresponding to a film surface is arranged when the zoom lens is used as a photographing optical system of a silver-halide film camera.

In spherical aberration diagrams of the aberration diagrams, a solid line indicates a d-line, and a two-dot chain line indicates a g-line. In the astigmatism diagrams of the aberration diagrams, a broken line indicates a meridional image plane, and a solid line indicates a sagittal image plane. A chromatic aberration of magnification is expressed for a g-line. The lateral aberration diagrams show, in order from an upper side, aberration diagrams of the d-line at image heights of 100%, 70%, the center, 70% on the opposite side, and 100% on the opposite side. A broken line indicates a sagittal image plane, and a solid line indicates a meridional image plane. Symbol Fno represents an F number, and symbol A represents a half field angle (degree). The half field angle A represents a value obtained from a ray tracing value. In the lens cross-sectional views, an arrow indicates a movement locus of each of the lens units during the zooming from the wide angle end to the telephoto end.

In the following examples, the wide angle end and the telephoto end respectively mean zoom positions when a variable magnification lens unit is located at one end and the other end in a range in which the variable magnification lens unit is mechanically movable on an optical axis.

Each example includes a plurality of image stabilizing units which are each moved in a direction having a component perpendicular to the optical axis during the image blur correction. At least one of the plurality of image stabilizing units is a shift image stabilizing unit, which is moved in the direction perpendicular to the optical axis to correct the image blur. At least one of the plurality of image stabilizing units is a tilt image stabilizing unit, which is rotated with a point on the optical axis or in the vicinity of the optical axis as a rotation center to correct the image blur. The tilt image stabilizing unit is located closer to the object side than the aperture stop SP, and the shift image stabilizing unit is located closer to the image side than the tilt image stabilizing unit.

In addition, the shift image stabilizing unit corrects the image blur at an angle equal to or more than half of an image blur correction angle at the wide angle end. The tilt image stabilizing unit corrects the image blur at an angle equal to or more than half of an image blur correction angle at the telephoto end. In addition, in the zoom range of a part of the entire zoom range from the wide angle end to the telephoto end, the correction angle of the image blur to be corrected by the shift image stabilizing unit and the correction angle of the image blur to be corrected by the tilt image stabilizing unit are equal to each other.

Firstly, the features of the lens configurations of the zoom lenses of Examples 1 to 3 are described. In the lens cross-sectional views of FIGS. 1, 5, and 9, a first lens unit L1 has a positive refractive power, a second lens unit L2 has a negative refractive power, a third lens unit L3 has a positive refractive power, a fourth lens unit L4 has a negative refractive power, and a fifth lens unit L5 has a positive refractive power. Each of Examples 1 to 3 corresponds to a five-unit zoom lens. The tilt image stabilizing unit is the first lens unit L1 or the second lens unit L2, and the shift image stabilizing unit is the third lens unit L3 or the fourth lens unit L4.

In the zoom lens of Example 1 illustrated in FIG. 1, each interval between adjacent lens units is changed as follows during the zooming from the wide angle end to the telephoto end. The interval between the first lens unit L1 and the second lens unit L2 is widened, and the interval between the second lens unit L2 and the third lens unit L3 is narrowed. In addition, the interval between the third lens unit L3 and the fourth lens unit L4 is narrowed, and the interval between the fourth lens unit L4 and the fifth lens unit L5 is widened. In Example 1, each lens unit is moved during the zooming.

Specifically, during the zooming from the wide angle end to the telephoto end, the first lens unit L1, the third lens unit L3, and the fourth lens unit L4 are moved to the object side. The second lens unit L2 is moved so as to draw a convex locus on the image side. The fifth lens unit L5 is moved so as to draw a convex locus on the object side. The high zoom ratio is realized while the reduction in size is realized in the entire system by moving each lens unit during the zooming as described above.

In the zoom lens of Example 2 illustrated in FIG. 5 and the Example 3 illustrated in FIG. 9, each interval between adjacent lens units is changed as follows during the zooming from the wide angle end to the telephoto end. The interval between the first lens unit L1 and the second lens unit L2 is widened, and the interval between the second lens unit L2 and the third lens unit L3 is narrowed. In addition, the interval between the third lens unit L3 and the fourth lens unit L4 is widened, and the interval between the fourth lens unit L4 and the fifth lens unit L5 is widened. In Examples 2 and 3, each lens unit is moved during the zooming.

Specifically, during the zooming from the wide angle end to the telephoto end, the first lens unit L1, the third lens unit L3, and the fourth lens unit L4 are moved to the object side. The second lens unit L2 is moved so as to draw a convex locus on the image side. The fifth lens unit L5 is moved so as to draw a convex locus on the object side. In Examples 1 to 3, the high zoom ratio is realized while the reduction in size is realized in the entire system by moving each lens unit during the zooming as described above.

In Example 1 illustrated in FIG. 1, the aperture stop SP is arranged on the object side of the third lens unit L3. By adopting such arrangement, the interval between the first lens unit L1 and the aperture stop SP is shortened, to thereby reduce an effective diameter of a front lens. During the zooming, the aperture stop SP is moved integrally with the third lens unit L3, to thereby prevent the effective diameter of the third lens unit L3 from increasing.

In Example 2 illustrated in FIG. 5, the aperture stop SP is arranged within the third lens unit L3. By disposing the aperture stop SP in such a manner, the interval between the second lens unit L2 and the third lens unit L3 at the telephoto end is narrowed, and a change amount of the interval between the second lens unit L2 and the third lens unit L3 for the zooming is made sufficiently large, to thereby facilitate the achievement of the high zoom ratio.

In Example 3 illustrated in FIG. 9, the aperture stop SP is arranged on the object side of the third lens unit L3. By adopting such arrangement, the interval between the first lens unit L1 and the aperture stop SP is shortened, to thereby reduce an effective diameter of a front lens. During the zooming, the aperture stop SP is moved integrally with the third lens unit L3, to thereby prevent the effective diameter of the third lens unit L3 from increasing.

In addition, in Example 3, the aperture stop SP is (independently) moved so as to draw a locus different from that of the third lens unit L3 during the zooming. Specifically, at the wide angle end, the aperture stop SP is located at the object side when viewed from the third lens unit L3 so that the distance with the first lens unit L1 is shortened, and at the telephoto end, the aperture stop SP is arranged close to the third lens unit L3 so that the interval between the second lens unit L2 and the third lens unit L3 is narrowed. By adopting such arrangement, the effective diameter of the front lens, which is determined on the wide angle side, is prevented from increasing, and the movement stroke between the second lens unit L2 and the third lens unit L3 for achieving the high zoom ratio is ensured to be sufficiently long.

In Examples 1 to 3, the aperture stop SP may be arranged on the image side of the third lens unit L3. In this case, the movement stroke between the second lens unit L2 and the third lens unit L3 can be ensured to be longer, which becomes advantageous in the achievement of the high zoom ratio. In the zoom lenses of Examples 1 to 3, it is preferred that the aperture stop SP be arranged between the second lens unit L2 and the third lens unit L3, within the third lens unit L3, or between the third lens unit L3 and the fourth lens unit L4.

In the zoom lens of Example 1 illustrated in FIG. 1, the third lens unit L3 is the shift image stabilizing unit, and the second lens unit L2 is the tilt image stabilizing unit. In the zoom lens of Example 2 illustrated in FIG. 5, the fourth lens unit L4 is the shift image stabilizing unit, and the first lens unit L1 is the tilt image stabilizing unit. In the zoom lens of Example 3 illustrated in FIG. 9, the third lens unit L3 is the shift image stabilizing unit, and the first lens unit L1 is the tilt image stabilizing unit.

Next, the features of the lens configurations of the zoom lenses of Examples 4 and 5 are described. In the lens cross-sectional views of FIGS. 13 and 17, a first lens unit L1 has a positive refractive power, a second lens unit L2 has a negative refractive power, a third lens unit L3 has a positive refractive power, and a fourth lens unit L4 has a positive refractive power. Each of Examples 4 and 5 corresponds to a four-unit zoom lens. The tilt image stabilizing unit is the first lens unit L1 or the second lens unit L2, and the shift image stabilizing unit is the third lens unit L3.

In the zoom lens of Example 4 illustrated in FIG. 13 and Example 5 illustrated in FIG. 17, each interval between adjacent lens units is changed as follows during the zooming. The interval between the first lens unit L1 and the second lens unit L2 is widened, and the interval between the second lens unit L2 and the third lens unit L3 is narrowed. In addition, the interval between the third lens unit L3 and the fourth lens unit L4 is widened. In Example 4, each lens unit is moved during the zooming.

Specifically, in the zoom lens of Example 4, during the zooming from the wide angle end to the telephoto end, the first lens unit L1 and the third lens unit L3 are moved to the object side. In addition, the second lens unit L2 is moved so as to draw the convex locus on the image side. The fourth lens unit L4 is moved so as to draw the convex locus on the object side. In Example 4, the aperture stop SP is arranged on the object side of the third lens unit L3. By adopting such arrangement, the effective diameter of the front lens is reduced by shortening the interval between the first lens unit L1 and the aperture stop SP. During the zooming, the aperture stop SP is moved integrally with the third lens unit L3, to thereby prevent the effective diameter of the third lens unit L3 from increasing.

In the zoom lens of Example 4 illustrated in FIG. 13, the third lens unit L3 is the shift image stabilizing unit, and the second lens unit L2 is the tilt image stabilizing unit.

In Example 5, during the zooming, the first lens unit L1 and the third lens unit L3 are immovable. Specifically, in the zoom lens of Example 5, during the zooming from the wide angle end to the telephoto end, the second lens unit L2 is moved to the image side, and the fourth lens unit L4 is moved so as to draw the convex locus on the object side. In Example 5, the aperture stop SP is arranged on the object side of the third lens unit L3. By adopting such arrangement, the effective diameter of the front lens is reduced by shortening the interval between the first lens unit L1 and the aperture stop SP. In Example 5, the aperture stop SP is immovable during the zooming.

In the zoom lens of Example 5 illustrated in FIG. 17, the third lens unit L3 is the shift image stabilizing unit, and the first lens unit L1 is the tilt image stabilizing unit. In Examples 4 and 5, the aperture stop SP may be arranged within the third lens unit L3 or between the third lens unit L3 and the fourth lens unit L4. In Examples 4 and 5, the image stabilizing units are appropriately set in the manner described above, to thereby ensure a peripheral light amount and reduce the decentering aberration during the image blur correction.

In the zoom lenses of Examples 1 to 5, on the telephoto side, the image blur is mainly corrected by the tilt image stabilizing unit. The tilt image stabilizing unit is given a rotational angle with a point on the optical axis as a center, which enables setting of both a shift component as a movement in the direction perpendicular to the optical axis and a tilt component as a tilt with respect to the optical axis.

An effect for correcting the image blur is obtained through addition of the shift component. An effect for reducing the decentering aberration occurring when the image stabilizing units are decentered is obtained through addition of the tilt component. The aberrations occurring during the decentration include an eccentric coma, an eccentric astigmatism, and a tilt of the image plane. Those decentering aberrations can be reduced by setting the suitable tilt component with respect to the shift component. The tilt image stabilizing unit is rotated with certain one point on the optical axis as a center. In this case, the reduction of the decentering aberrations by the tilt component is effectively carried out by suitably setting the rotation center position.

A ratio of an image blur correction angle to the photographing angle of field is largest at the telephoto end. Therefore, a change in the height of entrance at which the light flux passes through to the lens during the image blur correction becomes large at the telephoto end. In this case, when the shift component of the image stabilizing units is increased in order to correct the large image blur, many decentering aberrations occur. In the zoom lenses of Examples 1 to 5, at the telephoto end, the image blur correction is mainly carried out by the tilt image stabilizing unit, to thereby satisfactorily maintain the optical characteristic during the image blur correction.

If the lens unit closer to the object side than the aperture stop SP is used as the tilt image stabilizing unit, this is preferred because the effective diameter of the front lens is prevented from increasing. The change in the height of the entrance at which the light flux passes through the lens during the image blur correction occurs more frequently in the lens unit on the object side than in the image stabilizing unit. Therefore, if the lens unit on the object side is used as the image stabilizing unit as much as possible, it is possible to suppress the change in the height of the entrance at which the light flux passes through the lens in the front lens during the image blur correction. As a result, it becomes easy to ensure a sufficient peripheral light amount. In other words, it becomes easy to reduce the effective diameter of the front lens under the assumption that a predetermined peripheral light amount is ensured.

In the zoom lenses of Examples 1 to 5, the first lens unit L1 or the second lens unit L2 is used as the tilt image stabilizing unit, and under this condition, the decentering aberration correction is effectively carried out while the effective diameter of the front lens is reduced.

FIG. 22 is an explanatory view of a structure for realizing the rotation of the tilt image stabilizing unit. FIG. 22 illustrates a structure in which several spherical bodies SB are held between a lens holder LH and a fixed member LB adjacent to the lens holder LH. The lens holder LH can be made movable with respect to the fixed member LB by the rolling of the spherical bodies SB. In this case, if a receiving surface of the fixed member LB for the spherical bodies SB is formed as a spherical shape, the tilt image stabilizing unit can be rotated. Note that, a rotation center Lap of the rotation corresponds to a spherical surface center of the receiving surface.

During the zooming, it is only necessary that the lens holder LH, the spherical bodies SB, and the fixed member LB be moved integrally with one another in a direction of an optical axis La. In this case, however, a distance from the lens holder LH to the rotation center Lap is fixed irrespective of the level of the variable power.

When the rotation center of the tilt image stabilizing unit is determined so that the correction of the decentering aberration is satisfactory at the telephoto end, the correction of the decentering aberration is not necessarily satisfactory in other zoom positions. In particular, in the zoom lens in which the zoom ratio is large and the change in angle of field is large, the angle of entrance of the light to the first lens unit L1 and the second lens unit L2 is greatly changed depending on the zoom. For this reason, the decentering aberration occurring when the shift component is added differs depending on the zoom.

On the other hand, in the zoom lenses of Examples 1 to 5, the image stabilizing performance in the entire zoom range is satisfactorily maintained by providing the image stabilizing unit different from the tilt image stabilizing unit. Because a ratio of the image blur correction angle to the photographing angle of field is smallest at the wide angle end, the change in height of the entrance at which the light flux passes through the lens during the image blur correction is relatively small. Therefore, because the number of occurrences of the decentering aberration during the image blur correction is smaller at the wide angle end than at the telephoto end, the satisfactory optical characteristic is obtained during the image blur correction in the shift image stabilizing unit having no tilt component.

In the zoom lenses of Examples 1 to 5, the image blur correction is mainly carried out by the shift image stabilizing unit on the wide angle side. Note that, because the lens unit arranged relatively on the object side is used as the tilt image stabilizing unit in order to give priority to the securement of the well-known light amount ratio at the telephoto end, the shift image stabilizing unit is arranged closer to the image side than the tilt image stabilizing unit.

From the foregoing, in the zoom lenses of Examples 1 to 5, on the wide angle end side, the image blur correction is mainly carried out by the shift image stabilizing unit, and at the telephoto end, the image blur correction is mainly carried out by the tilt image stabilizing unit. Here, the word "mainly" means that the image stabilizing unit takes partial charge of half or more of the image blur correction angle. Therefore, the word is not such a limitation that at the wide angle end, the image blur correction is carried out by only the shift image stabilizing unit, and at the telephoto end, the image blur correction is carried out by only the tilt image stabilizing unit, but the image blur correction may also be carried out by combining those two image stabilizing units with each other.

It is preferred that, at the intermediate zoom position, the ratio between the partial responsibility of the shift image stabilizing unit and the partial responsibility of the tilt image stabilizing unit at the wide angle end be continuously connected to that at the telephoto end. As a result, the smooth zooming free from a feeling of wrongness can be carried out. If the shift image stabilizing unit is main at the wide angle end, and the tilt image stabilizing unit is main at the telephoto end, a position is present in the middle, where the partial responsibility of the image blur correction angle of the shift image stabilizing unit and the partial responsibility of the image blur correction angle of the tilt image stabilizing unit become halves, respectively. This intermediate zoom position is a boundary for determining which of the two image stabilizing units is to be set main, and is appropriately set from viewpoints of the correction of the decentering aberration and the reduction of the effective diameter of the front lens during the image stabilization.

Here, a value obtained by dividing a movement amount of an image point on the image plane due to the shift component of the image stabilizating unit by a movement amount of the shift component is defined as a image stabilization sensitivity. In order to achieve the reduction in size of a image stabilizing mechanism, it is preferred that the movement amount of the shift component be as small as possible. In this case, the larger image stabilization sensitivity is advantageous. Therefore, when the zoom lens includes a plurality of image stabilizing units, it is preferred that the partial responsibilities of the image blur correction be determined in consideration of the individual image stabilization sensitivities.

Note that, at an arbitrary zoom position, the shift image stabilizing unit and the tilt image stabilizing unit may be appropriately combined with each other. Points which need to be taken into consideration during the combination include the reduction of the decentering aberration, the securement of the peripheral light amount ratio, the power saving driving, the responsibility in control, and the like. It is preferred that a plurality of image stabilizing units be combined so as to achieve a good balance of those points.

As set forth hereinabove, according to the present invention, it is possible to obtain the zoom lens having the high optical characteristic and the sufficient peripheral light amount ratio even when the image stabilization correction angle is increased, and having the small effective diameter of the first lens.

In the zoom lens of the present invention, it is preferred to satisfy one or more of the following conditional expressions. The image stabilization sensitivity at the wide angle end of the tilt image stabilizing unit and the image stabilization sensitivity at the telephoto end of the tilt image stabilizing unit are represented by TSw and TSt, respectively. The image stabilization sensitivity at the wide angle end of the shift image stabilizing unit, and the image stabilization sensitivity at the telephoto end of the shift image stabilizing unit are represented by SSw and SSt, respectively. A focal length of the entire system at the zoom position where the image blur correction angles when the image blur correction are carried out by the shift image stabilizing unit and the tilt image stabilizing unit are equal to each other is represented by fm. In addition, a focal length of the entire system at the wide angle end and a focal length of the entire system at the telephoto end are represented by fw and ft, respectively.

A image stabilization sensitivity of the shift image stabilizing unit at the zoom position where the correction angle of the image blur to be corrected by the shift image stabilizing unit and the correction angle of the image blur to be corrected by the tilt image stabilizing unit are equal to each other is represented by SSm. A image stabilization sensitivity of the shift image stabilizing unit at the wide angle end is represented by SSw. A image stabilization sensitivity of the tilt image stabilizing unit at the zoom position where the correction angle of the image blur to be corrected by the shift image stabilizing unit and the correction angle of the image blur to be corrected by the tilt image stabilizing unit are equal to each other is represented by TSm. A image stabilization sensitivity of the tilt image stabilizing unit at the telephoto end is represented by TSt. Note that, the image stabilization sensitivity is defined as a value which is obtained by dividing the movement amount in the direction perpendicular to the optical axis of the image point on the image plane due to the shift component of the image stabilizing unit by the movement amount of the shift component. In this case, it is preferred to satisfy one or more of the following conditional expressions.

$$1.0 < |TSt| < 5.0 \quad (1)$$

$$2.0 < TSt/TSw < 100.0 \quad (2)$$

$$0.20 < SSw/SSt < 1.20 \quad (3)$$

$$fw \times 1.1 \leq fm \leq ft \times 0.9 \quad (4)$$

$$1.0 < SSm/SSw < 2.0 \quad (5)$$

$$0.01 < TSm/TSt < 1.00 \quad (6)$$

$$0.33 < SSm/TSm < 3.0 \quad (7)$$

Next, the technical meanings of the above-mentioned conditional expressions are described.

The conditional expression (1) defines the image stabilization sensitivity at the telephoto end of the tilt image stabilizing unit. If |TSt| in the conditional expression (1) exceeds an upper limit thereof and hence the image stabilization sensitivity becomes too large, the shift component during the image blur correction becomes too small. In this case, the precise control is required for the image blur, and in particular, it becomes difficult to correct a high-frequency image blur. On the other hand, if |TSt| in the conditional expression (1) exceeds a lower limit thereof and hence the image stabilization sensitivity becomes too small, the shift component for obtaining the desired image blur correction angle becomes too large. In this case, the driving stroke for the rotation becomes long, and hence a driving unit is increased in size, which is not preferable.

The conditional expression (2) defines a ratio of the image stabilization sensitivity at the telephoto end to the image stabilization sensitivity at the wide angle end of the tilt image stabilizing unit. When the entire system is intended to be reduced in size by decreasing the shift component of the image stabilizing unit, the image stabilization sensitivity needs to be increased to some degree. Because the tilt image stabilizing unit is mainly used on the telephoto side, it is preferred that the image stabilization sensitivity at the telephoto end be high to some degree. On the other hand, the image stabilization sensitivity at the wide angle end may be low.

With regard to the intermediate zoom position, in the zoom range which the tilt image stabilizing unit uses, it is preferred that the image stabilization sensitivity be high to some degree. If TSt/TSw in the conditional expression (2) exceeds an upper limit thereof, the zoom range which the tilt image stabilizing unit can use is limited because the image stabilization sensitivity at the wide angle end is too small. On the other hand, if TSt/TSw in the conditional expression (2) exceeds a lower limit thereof and hence the image stabilization sensitivity on the telephoto side becomes too low, the shift component for obtaining the desired image blur correction angle becomes too large. In this case, the driving stroke for the rotation becomes long, and hence the driving unit is increased in size, which is not preferable.

The conditional expression (3) defines a ratio of the image stabilization sensitivity at the wide angle end to the image stabilization sensitivity at the telephoto end of the shift image stabilizing unit. Because the shift image stabilizing unit is mainly used at the wide angle end, it is preferred that the image stabilization sensitivity at the wide angle end be high to some degree.

On the other hand, the image stabilization sensitivity at the telephoto end may be low. With regard to the intermediate zoom position, in the zoom range which the shift image stabilizing unit uses, it is preferred that the image stabilization sensitivity be high to some degree. If SSw/SSt in the conditional expression (3) exceeds an upper limit thereof, the zoom range which the shift image stabilizing unit can use is limited because the image stabilization sensitivity at the telephoto end is too low. On the other hand, if SSw/SSt in the conditional expression (3) exceeds a lower limit thereof and hence the image stabilization sensitivity on the wide angle side becomes too low, the shift component for obtaining the desired image blur correction angle becomes too large. In this case, the driving stroke becomes long, and hence a driving unit is increased in size, which is not preferable.

The conditional expression (4) defines the intermediate zoom position where the image blur correction angle of which the shift image stabilizing unit takes partial charge and the image blur correction angle of which the tilt image stabilizing unit takes partial charge become equal to each other. If fm in the conditional expression (4) exceeds an upper limit thereof and hence the zoom position is too close to the telephoto end, the zoom range in which the image blur correction is carried out mainly by the shift image stabilizing unit is widened. In this case, the zoom range in which the number of occurrences of the decentering aberration is increased is widened by only the shift component.

In addition, the driving stroke for the image blur correction of the shift image stabilizing unit becomes too long, and hence the driving unit is increased in size. On the other hand, if fm in the conditional expression (4) exceeds a lower limit thereof and hence the zoom position is too close to the wide angle end, the zoom range in which the image blur correction is carried out mainly by the tilt image stabilizing unit is widened. In this case, the correction of the decentering aberration by the tilt component of the tilt image stabilizing unit becomes excessive, which is not preferable.

The conditional expression (5) defines a ratio of the image stabilization sensitivity at the intermediate zoom position defined by the conditional expression (4) to the image stabilization sensitivity at the wide angle end of the shift image stabilizing unit. A shift amount of the image stabilizing unit to a specific image blur correction angle is proportional to the focal length, and is inversely proportional to the image stabilization sensitivity. Therefore, because the focal length becomes longer at the intermediate zoom position than at the wide angle end, by increasing the image stabilization sensitivity accordingly, the shift amount needs not to be increased.

If SSm/SSw in the conditional expression (5) exceeds a lower limit thereof, although the focal length is longer at the intermediate zoom position than at the wide angle end, the image stabilization sensitivity is reduced, and hence the shift amount is increased, which is not preferable. On the other hand, if SSm/SSw in the conditional expression (5) exceeds an upper limit thereof, the high-precise image blur correction needs to be carried out because the image stabilization sensitivity at the intermediate zoom position is too high. In this case, in particular, the control for the high-frequency image blur becomes difficult to carry out, which is not preferable.

The conditional expression (6) defines a ratio of the image stabilization sensitivity at the intermediate zoom position to the image stabilization sensitivity at the telephoto end of the tilt image stabilizing unit. If TSm/TSt in the conditional expression (6) exceeds an upper limit thereof, the image stabilization sensitivity becomes higher at the intermediate zoom position than at the telephoto end. For the specific image blur correction angle, the sensitivity needs not to be higher at the intermediate zoom position than at the telephoto end, and hence it becomes difficult to carry out the control for the image blur correction, which is not preferable.

If TSm/TSt in the conditional expression (6) exceeds a lower limit thereof and hence the image stabilization sensitivity at the intermediate zoom position becomes too low, the shift component necessary for the image blur correction needs to be increased. In this case, even when the image stabilization sensitivity at the telephoto end is increased, the driving stroke is determined at the intermediate zoom position, and hence it becomes difficult to achieve the reduction in size of the entire system.

The conditional expression (7) defines a ratio of the image stabilization sensitivity of the shift image stabilizing unit at the intermediate zoom position to the image stabilization sensitivity of the tilt image stabilizing unit at the intermediate zoom position. If in the two image stabilizing units, the image stabilization sensitivities for the same image blur correction angle largely differs from each other, it becomes difficult to simultaneously control the two image stabilizing units with the same precision. In order to enhance the precision of an image blur correction angle obtained through the composition, it is preferred that the vibration sensitivities of the two image stabilizing units be not quite different from each other. Therefore, it is preferred that the value in the conditional expression (7) be not greatly away from 1.0. If SSm/TSm in the conditional expression (7) exceeds an upper limit or a lower limit thereof, the precision of the image blur correction angle obtained through the composition is reduced, which is not preferable.

It is more preferred to set the numerical value ranges of the conditional expressions (1) to (7) as follows.

$$1.5 < |TSt| < 4.0 \tag{1a}$$

$$3.0 < TSt/TSw < 80.0 \tag{2a}$$

$$0.40 < SSw/SSt < 1.00 \tag{3a}$$

$$fw \times 1.2 < fm < ft \times 0.8 \tag{4a}$$

$$1.05 < SSm/SSw < 1.90 \tag{5a}$$

$$0.03 < TSm/TSt < 0.80 \tag{6a}$$

$$0.40 < SSm/TSm < 2.50 \tag{7a}$$

It is more preferred to set the numerical value ranges of the conditional expressions (1a) to (7a) as follows.

$$1.8 < |TSt| < 3.5 \tag{1b}$$

$$4.0 < TSt/TSw < 60.0 \tag{2b}$$

$$0.50 < SSw/SSt < 0.95 \tag{3b}$$

$$fw \times 1.5 < fm < ft \times 0.5 \tag{4b}$$

$$1.06 < SSm/SSw < 1.75 \tag{5b}$$

$$0.04 < TSm/TSt < 0.70 \tag{6b}$$

$$0.50 < SSm/TSm < 2.00 \tag{7b}$$

When the zoom lens of the present invention is used in an image pickup apparatus including an image pickup element configured to receive light corresponding to an image formed by the zoom lens, it is preferred to satisfy one or more of the following conditional expressions. A distance from the apex of the lens surface closest to the object side of the tilt image stabilizing unit at the telephoto end to the aperture stop SP is represented by D1. An effective diagonal length of the imaging surface of the image pickup element is represented by L. A distance from the apex of the lens surface closest to the object side of the tilt image stabilizing unit at the telephoto end to the apex of the lens surface closest to the object side of the shift image stabilizing unit is represented by D2. In addition, a distance from the apex of the lens surface closest to the object side of the tilt image stabilizing unit to the rotation center during the image blur correction is represented by R.

In this case, the rotation center is moved along with the movement of the tilt image stabilizing unit. For this reason, the distance R is constant at all the zoom positions. In addition, the distance R is set as positive when the rotation center is located closer to the image side than the apex of the lens surface closest to the object side of the tilt image stabilizing unit, and is set as negative when the rotation center is located closer to the object side than the apex of the lens surface closest to the object side of the tilt image stabilizing unit. In this case, it is preferred to satisfy one or more of the following conditional expressions.

$$0.4 < D1/L < 20.0 \tag{8}$$

$$0.5 < D2/L < 20.0 \tag{9}$$

$$3.0 < R/L < 30.0 \tag{10}$$

Next, the technical meanings of the above-mentioned conditional expressions are described. The conditional expression (8) defines the position in the direction of the optical axis of the tilt image stabilizing unit with respect to the aperture stop SP. If D1/L in the conditional expression (8) exceeds an upper limit thereof and hence the distance from the aperture stop SP is too long, the lens unit having the large effective diameter needs to be rotated in order to correct the image blur. In this case, it becomes difficult to reduce the size and weight of a lens barrel because the mechanism for the rotation is increased in size.

If the lens unit in the vicinity of the aperture stop SP is intended to include only a few lenses, the curvature of the lens surface becomes strong (the radius of curvature of the lens surface becomes small). If, in such a lens unit, the shift component is set to be large in correspondence to the large image blur correction angle, the decentering aberration occurs greatly. On the other hand, if D1/L in the conditional expression (8) exceeds a lower limit thereof and hence the distance from the aperture stop SP is too short, the decentering aberration occurring in the shift component becomes excessive. As a result, even when the tilt component is set, it becomes difficult to sufficiently correct the decentering aberration, and hence it becomes difficult to satisfactorily maintain the optical characteristic during the image blur correction.

The conditional expression (9) defines the position in the direction of the optical axis of the shift image stabilizing unit with respect to the tilt image stabilizing unit. If D2/L in the conditional expression (9) exceeds an upper limit thereof and hence the distance from the tilt image stabilizing unit is too long, the driving unit of the shift image stabilizing unit approaches the image pickup element to exert an influence of the noise or the like on the zoom lens, to thereby reduce the image quality. On the other hand, if D2/L in the conditional expression (9) exceeds a lower limit thereof and hence the distance from the tilt image stabilizing unit to the shift image stabilizing unit is too short, it becomes difficult to dispose the driving units of those two image stabilizing units so as not to physically interfere with each other. As a result, the lens barrel is increased in size, which is not preferable.

The conditional expression (10) defines the rotation center position when the tilt image stabilizing unit is rotated with one point on the optical axis as a rotation center. If R/L in the conditional expression (10) exceeds an upper limit thereof and hence the rotation center position is too far from the tilt image stabilizing unit, an effect for reducing the decentering aberration occurring in the shift component is weakened because the tilt component is too small, which is not preferable. On the other hand, if R/L in the conditional expression (10) exceeds a lower limit thereof and hence the rotation center position is too close to the tilt image stabilizing unit, when the shift component necessary for the desired image blur correction is intended to be obtained, the tilt component becomes very large angle. As a result, many high-order decentering aberrations occur in the tilt component, and the satisfactory cancel relationship cannot be obtained with the shift component, which is not preferable.

It is more preferred to set the numerical value ranges of the conditional expressions (8) to (10) as follows.

$$0.5 < D1/L < 16.0 \tag{8a}$$

$$0.7 < D2/L < 18.0 \tag{9a}$$

$$4.0 < R/L < 25.0 \tag{10a}$$

It is more preferred to set the numerical value ranges of the conditional expressions (8a) to (10a) as follows.

$$0.6 < D1/L < 15.0 \tag{8b}$$

$$0.8 < D2/L < 15.0 \tag{9b}$$

$$5.0 < R/L < 22.0 \tag{10b}$$

Next, a camcorder (video camera) according to one embodiment of the present invention, which uses the zoom lens of the present invention as a photographing optical system, is described with reference to FIG. 21. In FIG. 21, the camcorder includes a camera main body 10 and a photographing optical system 11 corresponding to any one of the zoom lenses described above in Examples 1 to 5. A solid-state image pickup element (photo-electric conversion element) 12 such as a CCD sensor or a CMOS sensor is built in the camera main body 10, and receives light corresponding to an object image formed by the photographing optical system 11. A finder 13 includes a liquid crystal display panel or the like, and is used to observe the object image formed on the solid-state image pickup element 12.

It is preferred that the image pickup apparatus of the present invention include any one of the above-mentioned zoom lenses and a circuit for electrically correcting the distortion and/or the lateral chromatic aberration. If the zoom lens is constructed to have a lens structure which can permit the distortion in such a manner, it becomes easy to reduce the number of lenses of the zoom lens and the size of the zoom lens. In addition, by electrically correcting the lateral chromatic aberration, the color bleeding of the photographed image is reduced and the resolving power is easily enhanced.

Next, Numerical Examples 1 to 5 are described, which correspond to Examples 1 to 5 of the present invention, respectively. In each of Numerical Examples 1 to 5, symbol i represents the order of a surface from an object. Symbol ri represents a radius of curvature of an i-th surface in order from the object side, symbol di represents a lens thickness and an air gap between an i-th surface and an (i+1)th surface in order from the object side, and symbols ndi and vdi represent a refractive index and an Abbe number of a material of an optical member between the i-th surface and the (i+1)th surface in order from the object side, respectively. In addition, two surfaces closest to the image side are made of a glass material such as a face plate. An aspherical shape is expressed by the expression below.

$$X = \frac{\frac{H^2}{R}}{1 + \sqrt{1 - (1+K)\left(\frac{H}{R}\right)^2}} + A4H^4 + A6H^6 + A8H^8 + A10H^{10}$$

where the X axis corresponds to the optical axis direction, the H axis corresponds to the direction perpendicular to the optical axis, the light propagation direction is positive, symbol R represents a paraxial curvature radius, symbol K represents a conic constant, and symbols A4, A6, A8, and A10 represent aspherical coefficients, respectively.

In addition, * means a surface having an aspherical shape, and [e–x] means ×10$^{-x}$. Symbol BF is back focus, which is represented by an air-converted length from a final lens surface to an image plane.

In the lens unit position data during the blur correction, the rotation center position represents the distance from the apex of the lens surface closest to the object side of the tilt image stabilizing unit to the rotation center of the tilt image stabilizing unit. In addition, a plus sign means the image side when viewed from the tilt image stabilizing unit. The tilt angle represents the rotation angle during the blur correction, and the plus sign means a counterclockwise direction in the lens cross-sectional views of Examples. The shift amount represents the movement amount in the direction perpendicular to the optical axis during the blur correction, and the plus sign means an upper direction in the lens cross-sectional views of Examples.

The blur (image blur) correction angle represents, when only the shift image stabilizing unit is used, a correction angle in this case. In addition, when only the tilt image stabilizing unit is used, the blur (image blur) correction angle represents a correction angle in this case. Moreover, when both the tilt image stabilizing unit and the shift image stabilizing unit are used, the blur (image blur) correction angle represents a correction angle when those image stabilizing units are simultaneously set. Note that, the blur (image blur) correction angle represents a correction angle at the center of the screen. Table 1 shows the lens data of Numerical Examples and the calculation results of the conditional expressions based on the lens data.

NUMERICAL EXAMPLE 1

Unit: mm

Surface data

| Surface number | r | d | nd | vd |
|---|---|---|---|---|
| 1 | 33.006 | 0.95 | 1.84666 | 23.9 |
| 2 | 22.725 | 3.05 | 1.49700 | 81.5 |
| 3 | 171.041 | 0.20 | | |
| 4 | 26.796 | 2.15 | 1.65160 | 58.5 |
| 5 | 133.556 | (Variable) | | |
| 6 | −94.893 | 0.50 | 1.88300 | 40.8 |
| 7 | 6.395 | 2.55 | | |
| 8 | −13.387 | 0.50 | 1.77250 | 49.6 |
| 9 | 45.843 | 0.20 | | |
| 10 | 15.960 | 1.45 | 1.94595 | 18.0 |
| 11 | −186.347 | (Variable) | | |
| 12 (Stop) | ∞ | 1.00 | | |
| 13* | 6.314 | 1.95 | 1.59201 | 67.0 |
| 14* | −28.862 | 1.00 | | |
| 15 | 10.979 | 0.46 | 1.84666 | 23.8 |
| 16 | 5.831 | 0.85 | | |
| 17 | −14.140 | 1.50 | 1.48749 | 70.2 |
| 18 | −7.079 | (Variable) | | |
| 19 | −29.363 | 0.45 | 1.77250 | 49.6 |
| 20 | 411.426 | (Variable) | | |
| 21 | 12.864 | 2.60 | 1.51633 | 64.1 |
| 22 | −29.582 | 0.45 | 1.76182 | 26.5 |
| 23 | −73.269 | (Variable) | | |
| 24 | ∞ | 0.80 | 1.51633 | 64.1 |
| 25 | ∞ | 1.33 | | |
| Image plane | ∞ | | | |

Aspherical surface data

Thirteenth surface

K = 0.00000e+000 A4 = −3.27123e−004 A6 = 6.78754e−006
A8 = −2.91559e−007

Fourteenth surface

K = 0.00000e+000 A4 = 5.72509e−004 A6 = 1.00441e−005
A8 = −4.50912e−007

Various data
Zoom ratio 13.25

| | Wide angle | Intermediate | Telephoto |
|---|---|---|---|
| Focal length | 5.15 | 8.13 | 68.24 |
| F number | 3.51 | 3.87 | 5.90 |
| Half angle of field (degrees) | 37.65 | 25.88 | 3.24 |
| Image height | 3.30 | 3.68 | 3.88 |
| Total lens length | 52.43 | 52.17 | 77.40 |
| BF | 5.88 | 9.71 | 8.50 |
| d5 | 0.94 | 4.00 | 22.98 |
| d11 | 17.18 | 10.75 | 1.10 |
| d18 | 4.48 | 3.07 | 2.95 |
| d20 | 2.14 | 2.84 | 20.06 |
| d23 | 4.02 | 7.85 | 6.65 |

Zoom lens unit data

| Unit | First surface | Focal length |
|---|---|---|
| 1 | 1 | 37.60 |
| 2 | 6 | −6.46 |
| 3 | 12 | 11.66 |
| 4 | 19 | −35.46 |
| 5 | 21 | 23.81 |
| 6 | 24 | ∞ |

Lens unit position data during blur correction

| | Wide angle | Intermediate | Telephoto |
|---|---|---|---|
| Rotation center position of second lens unit | 50.0 mm | 50.0 mm | 50.0 mm |
| Tilt angle of second lens unit | 0.0 min | 14.6 min | 77.0 min |
| Shift amount of third lens unit | 0.178 mm | 0.126 mm | 0.0 mm |
| Blur correction angle | 3.0° | 3.0° | 3.0° |

NUMERICAL EXAMPLE 2

Unit: mm

Surface data

| Surface number | r | d | nd | vd |
|---|---|---|---|---|
| 1 | 41.869 | 0.78 | 1.84666 | 23.9 |
| 2 | 24.881 | 2.96 | 1.49700 | 81.5 |
| 3 | 516.824 | 0.13 | | |
| 4 | 26.877 | 2.02 | 1.71300 | 53.9 |
| 5 | 128.894 | (Variable) | | |
| 6 | 288.793 | 0.42 | 1.88300 | 40.8 |
| 7 | 5.491 | 2.88 | | |
| 8 | −19.224 | 0.40 | 1.80400 | 46.6 |
| 9 | 28.881 | 0.10 | | |
| 10 | 11.504 | 1.29 | 1.95906 | 17.5 |
| 11 | 49.808 | (Variable) | | |
| 12* | 8.583 | 1.30 | 1.62263 | 58.2 |

-continued

Unit: mm

| | | | | |
|---|---|---|---|---|
| 13* | −29.609 | 1.10 | | |
| 14 (Stop) | ∞ | 1.30 | | |
| 15 | 14.662 | 0.50 | 1.84666 | 23.9 |
| 16 | 6.805 | 0.47 | | |
| 17* | 54.452 | 1.40 | 1.55332 | 71.7 |
| 18* | −10.055 | (Variable) | | |
| 19 | −151.769 | 0.40 | 1.88300 | 40.8 |
| 20 | 26.078 | (Variable) | | |
| 21 | 15.946 | 2.54 | 1.77250 | 49.6 |
| 22 | −28.396 | 0.50 | 1.92286 | 18.9 |
| 23 | −77.555 | (Variable) | | |
| 24 | ∞ | 0.80 | 1.51633 | 64.1 |
| 25 | ∞ | 1.33 | | |
| Image plane | ∞ | | | |

Aspherical surface data

Twelfth surface

K = −2.76265e−001 A4 = −3.36198e−005 A6 = 7.15722e−005
A8 = −1.02976e−005 A10 = 6.45194e−007

Thirteenth surface

K = 0.00000e+000 A4 = 5.50979e−004 A6 = 8.38511e−005
A8 = −1.42898e−005 A10 = 9.41810e−007

Seventeenth surface

K = 0.00000e+000 A4 = 7.96626e−004 A6 = 6.28010e−005
A8 = −2.10515e−005 A10 = 1.50759e−006

Eighteenth surface

K = −6.21035e+000 A4 = −5.18516e−004 A6 = 7.06929e−005
A8 = −1.56716e−005 A10 = 9.30629e−007

Various data
Zoom ratio 18.93

| | Wide angle | Intermediate | Telephoto |
|---|---|---|---|
| Focal length | 4.63 | 20.99 | 87.75 |
| F number | 3.61 | 5.00 | 6.96 |
| Half angle of field (degrees) | 40.59 | 10.50 | 2.49 |
| Image height | 3.33 | 3.88 | 3.88 |
| Total lens length | 50.22 | 62.71 | 77.46 |
| BF | 8.20 | 14.43 | 5.76 |
| d5 | 0.70 | 13.73 | 24.44 |
| d11 | 16.72 | 4.12 | 0.45 |
| d18 | 1.71 | 6.19 | 10.85 |
| d20 | 2.41 | 3.75 | 15.48 |
| d23 | 6.35 | 12.57 | 3.90 |

Zoom lens unit data

| Unit | First surface | Focal length |
|---|---|---|
| 1 | 1 | 38.33 |
| 2 | 6 | −6.10 |
| 3 | 12 | 11.21 |
| 4 | 19 | −25.18 |
| 5 | 21 | 18.36 |
| 6 | 24 | ∞ |

Lens unit position data during blur correction

| | Wide angle | Intermediate | Telephoto |
|---|---|---|---|
| Rotation center position of first lens unit | 60.0 mm | 60.0 mm | 60.0 mm |
| Tilt angle of first lens unit | 0.0 min | −61.0 min | −122.0 min |
| Shift amount of fourth lens unit | −0.558 mm | −0.842 mm | 0.0 mm |
| Blur correction angle | 3.0° | 3.0° | 3.0° |

NUMERICAL EXAMPLE 3

Unit: mm

Surface data

| Surface number | r | d | nd | vd |
|---|---|---|---|---|
| 1 | 90.789 | 1.45 | 1.91082 | 35.3 |
| 2 | 49.843 | 5.51 | 1.49700 | 81.5 |
| 3 | −191.211 | 0.10 | | |
| 4 | 41.143 | 3.30 | 1.49700 | 81.5 |
| 5 | 123.785 | (Variable) | | |
| 6 | 190.357 | 0.75 | 1.83481 | 42.7 |
| 7 | 8.502 | 5.19 | | |
| 8 | −31.911 | 0.60 | 1.77250 | 49.6 |
| 9 | 31.911 | 0.15 | | |
| 10 | 17.269 | 1.97 | 1.95906 | 17.5 |
| 11 | 59.201 | (Variable) | | |
| 12 (Stop) | ∞ | (Variable) | | |
| 13* | 10.080 | 2.70 | 1.55332 | 71.7 |
| 14* | −154.777 | 2.06 | | |
| 15 | 28.619 | 0.60 | 1.80400 | 46.6 |
| 16 | 10.520 | 0.35 | | |
| 17 | 15.233 | 0.60 | 2.00100 | 29.1 |
| 18 | 10.938 | 2.43 | 1.49700 | 81.5 |
| 19 | −25.670 | (Variable) | | |
| 20 | 116.246 | 0.70 | 1.48749 | 70.2 |
| 21 | 24.656 | (Variable) | | |
| 22 | 25.059 | 2.20 | 1.88300 | 40.8 |
| 23 | −25.059 | 0.50 | 2.00069 | 25.5 |
| 24 | −2889.001 | (Variable) | | |
| 25 | ∞ | 0.80 | 1.51633 | 64.1 |
| 26 | ∞ | 1.0 | | |
| Image plane | ∞ | | | |

Aspherical surface data

Thirteenth surface

K = −7.62610e−003 A4 = −9.09797e−005 A6 = −3.52936e−007
A8 = −4.79796e−009

Fourteenth surface

K = 0.00000e+000 A4 = 2.33477e−005 A6 = −4.82626e−008

Various data
Zoom ratio 47.51

| | Wide angle | Intermediate | Telephoto |
|---|---|---|---|
| Focal length | 4.42 | 14.23 | 210.00 |
| F number | 2.69 | 3.82 | 6.35 |
| Half angle of field (degrees) | 41.56 | 15.30 | 1.04 |
| Image height | 3.33 | 3.88 | 3.88 |
| Total lens length | 96.80 | 95.21 | 138.36 |
| BF | 11.54 | 20.07 | 9.98 |
| d5 | 0.78 | 16.60 | 61.74 |
| d11 | 36.08 | 13.50 | 1.05 |
| d12 | 9.80 | 3.45 | 0.35 |
| d19 | 2.73 | 5.61 | 8.77 |
| d21 | 4.72 | 4.82 | 25.30 |
| d24 | 10.01 | 18.55 | 8.46 |

Zoom lens unit data

| Unit | First surface | Focal length |
|---|---|---|
| 1 | 1 | 80.35 |
| 2 | 6 | −9.37 |
| 3 | 12 | ∞ |
| 4 | 13 | 19.66 |
| 5 | 20 | −64.35 |
| 6 | 22 | 32.19 |
| 7 | 25 | ∞ |

-continued

Unit: mm

Lens unit position data during blur correction

|  | Wide angle | Intermediate | Telephoto |
|---|---|---|---|
| Rotation center position of first lens unit | 100.0 mm | 100.0 mm | 100.0 mm |
| Tilt angle of first lens unit | 0.0 min | −77.0 min | −102.0 min |
| Shift amount of third lens unit | 0.190 mm | 0.230 mm | 0.0 mm |
| Blur correction angle | 3.0° | 3.0° | 2.0° |

NUMERICAL EXAMPLE 4

Unit: mm

Surface data

| Surface number | r | d | nd | νd |
|---|---|---|---|---|
| 1 | 44.452 | 1.00 | 1.85478 | 24.8 |
| 2 | 28.340 | 2.90 | 1.49700 | 81.5 |
| 3 | 210.840 | 0.20 | | |
| 4 | 30.299 | 2.20 | 1.69680 | 55.5 |
| 5 | 124.282 | (Variable) | | |
| 6 | 132.715 | 0.65 | 1.80400 | 46.6 |
| 7 | 6.602 | 3.75 | | |
| 8 | −17.644 | 0.50 | 1.69680 | 55.5 |
| 9 | 53.704 | 0.20 | | |
| 10 | 15.107 | 1.25 | 1.95906 | 17.5 |
| 11 | 45.209 | (Variable) | | |
| 12 (Stop) | ∞ | 0.46 | | |
| 13* | 5.519 | 2.20 | 1.55332 | 71.7 |
| 14* | −24.286 | 0.60 | | |
| 15 | 14.548 | 0.70 | 1.80610 | 33.3 |
| 16 | 4.810 | 0.46 | | |
| 17 | 7.779 | 1.40 | 1.48749 | 70.2 |
| 18 | 17.634 | (Variable) | | |
| 19 | 18.200 | 1.85 | 1.77250 | 49.6 |
| 20 | −37.698 | 0.50 | 1.80518 | 25.4 |
| 21 | 108.654 | (Variable) | | |
| 22 | ∞ | 1.00 | 1.51633 | 64.1 |
| 23 | ∞ | 1.0 | | |
| Image plane | ∞ | | | |

Aspherical surface data

Thirteenth surface

K = −2.81482e−002 A4 = −5.11671e−004 A6 = −1.41521e−005
A8 = 2.90395e−007 A10 = −4.05939e−008

Fourteenth surface

K = −1.08553e+001 A4 = 8.96729e−005 A6 = −3.50338e−006

Various data
Zoom ratio 15.12

|  | Wide angle | Intermediate | Telephoto |
|---|---|---|---|
| Focal length | 5.13 | 18.81 | 77.60 |
| F number | 3.58 | 4.72 | 6.07 |
| Half angle of field (degrees) | 37.82 | 11.66 | 2.83 |
| Image height | 3.41 | 3.88 | 3.88 |
| Total lens length | 58.07 | 62.55 | 81.87 |
| BF | 7.46 | 15.74 | 8.27 |
| d5 | 0.70 | 14.39 | 29.25 |
| d11 | 22.68 | 6.60 | 1.39 |
| d18 | 6.40 | 4.99 | 22.14 |
| d21 | 5.80 | 14.08 | 6.61 |

-continued

Unit: mm

Zoom lens unit data

| Unit | First surface | Focal length |
|---|---|---|
| 1 | 1 | 46.30 |
| 2 | 6 | −7.80 |
| 3 | 12 | 14.46 |
| 4 | 19 | 28.89 |
| 5 | 22 | ∞ |

Lens unit position data during blur correction

|  | Wide angle | Intermediate | Telephoto |
|---|---|---|---|
| Rotation center position of second lens unit | 100.0 mm | 100.0 mm | 100.0 mm |
| Tilt angle of second lens unit | 2.6 min | 11.4 min | 40.0 min |
| Shift amount of third lens unit | 0.191 mm | 0.333 mm | 0.352 mm |
| Blur correction angle | 3.0° | 3.0° | 3.0° |

NUMERICAL EXAMPLE 5

Unit: mm

Surface data

| Surface number | r | d | nd | νd |
|---|---|---|---|---|
| 1 | 44.532 | 1.05 | 1.84666 | 23.9 |
| 2 | 23.721 | 4.30 | 1.60311 | 60.6 |
| 3 | −565.239 | 0.17 | | |
| 4 | 22.127 | 2.40 | 1.71300 | 53.9 |
| 5 | 51.705 | (Variable) | | |
| 6 | 25.787 | 0.60 | 1.80400 | 46.6 |
| 7 | 4.719 | 3.20 | | |
| 8 | −22.341 | 0.60 | 1.80400 | 46.6 |
| 9 | 12.378 | 0.55 | | |
| 10 | 9.826 | 1.45 | 1.95906 | 17.5 |
| 11 | 26.220 | (Variable) | | |
| 12 (Stop) | ∞ | 1.11 | | |
| 13 | 12.201 | 0.60 | 1.95906 | 17.5 |
| 14 | 9.418 | 2.35 | 1.58313 | 59.4 |
| 15* | −37.342 | (Variable) | | |
| 16 | 9.392 | 0.60 | 1.90366 | 31.3 |
| 17 | 5.873 | 2.55 | 1.48749 | 70.2 |
| 18 | −16.905 | (Variable) | | |
| 19 | ∞ | 1.40 | 1.51633 | 64.1 |
| 20 | ∞ | 1.22 | | |
| Image plane | ∞ | | | |

Aspherical surface data

Fifteenth surface

K = −6.30551e+000 A4 = 1.22507e−004

Various data
Zoom ratio 31.81

|  | Wide angle | Intermediate | Telephoto |
|---|---|---|---|
| Focal length | 2.89 | 24.97 | 91.93 |
| F number | 1.85 | 3.97 | 4.50 |
| Half angle of field (degrees) | 32.49 | 3.63 | 0.98 |
| Image height | 1.76 | 1.58 | 1.58 |
| Total lens length | 65.95 | 65.95 | 65.95 |
| BF | 9.30 | 13.94 | 4.28 |
| d5 | 0.50 | 20.28 | 25.22 |
| d11 | 26.75 | 6.97 | 2.03 |

-continued

Unit: mm

| | | | |
|---|---|---|---|
| d15 | 7.88 | 3.24 | 12.91 |
| d18 | 7.16 | 11.80 | 2.13 |

Zoom lens unit data

| Unit | First surface | Focal length |
|---|---|---|
| 1 | 1 | 35.16 |
| 2 | 6 | −5.30 |
| 3 | 12 | 18.53 |
| 4 | 16 | 18.48 |
| 5 | 19 | ∞ |

Lens unit position data during blur correction

| | Wide angle | Intermediate | Telephoto |
|---|---|---|---|
| Rotation center position of first lens unit | 60.0 mm | 60.0 mm | 60.0 mm |
| Tilt angle of first lens unit | 0.0 min | −57.0 min | −114.0 min |
| Shift amount of third lens unit | 0.187 mm | 0.744 mm | 0.0 mm |
| Blur correction angle | 3.0° | 3.0° | 2.0° |

TABLE 1

| | Example 1 | Example 2 | Example 3 | Example 4 | Example 5 |
|---|---|---|---|---|---|
| Conditional Expression (1) | 3.246 | 2.290 | 2.614 | 2.943 | 2.615 |
| Conditional Expression (2) | 4.555 | 18.938 | 47.520 | 4.901 | 31.809 |
| Conditional Expression (3) | 0.580 | 0.653 | 0.538 | 0.611 | 0.926 |
| Conditional Expression (4) fw × 1.1 | 5.67 | 5.10 | 4.86 | 5.65 | 3.18 |
| fm | 8.13 | 20.99 | 14.23 | 18.81 | 24.97 |
| ft × 0.9 | 61.42 | 78.98 | 189.00 | 69.84 | 82.74 |
| Conditional Expression (5) | 1.116 | 1.502 | 1.329 | 1.259 | 1.088 |
| Conditional Expression (6) | 0.315 | 0.239 | 0.068 | 0.505 | 0.272 |
| Conditional Expression (7) | 0.648 | 0.980 | 0.715 | 0.769 | 1.008 |
| Conditional Expression (8) | 0.813 | 4.938 | 10.556 | 0.999 | 13.195 |
| Conditional Expression (9) | 0.942 | 6.811 | 10.601 | 1.058 | 13.546 |
| Conditional Expression (10) | 6.452 | 7.742 | 12.903 | 12.903 | 19.048 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-269055, filed Dec. 26, 2013, which is hereby incorporated by reference herein in its entirety.

What is claimed is:

1. A zoom lens, comprising, in order from an object side to an image side:
   a first lens unit having a positive refractive power;
   a second lens unit having a negative refractive power;
   a third lens unit having a positive refractive power;
   a fourth lens unit having a positive or negative refractive power;
   an aperture stop arranged one of between the second lens unit and the third lens unit, within the third lens unit, and between the third lens unit and the fourth lens unit,
   the zoom lens being configured such that, during zooming from a wide angle end to a telephoto end, an interval between the first lens unit and the second lens unit is widened, an interval between the second lens unit and the third lens unit is narrowed, and an interval between the third lens unit and the fourth lens unit is changed; and
   a plurality of image stabilizing units configured to be moved in a direction in which the direction has a component in a direction perpendicular to an optical axis during image blur correction,
   wherein at least one of the plurality of image stabilizing units comprises a shift image stabilizing unit configured to be moved in the direction perpendicular to the optical axis to carry out the image blur correction,
   wherein at least one of the plurality of image stabilizing units comprises a tilt image stabilizing unit configured to be rotated with one of a point on the optical axis and a point near the optical axis as a rotation center to carry out the image blur correction, and
   wherein the tilt image stabilizing unit is located closer to the object side than the aperture stop, and the shift image stabilizing unit is located closer to the image side than the tilt image stabilizing unit.

2. A zoom lens according to claim 1, wherein the shift image stabilizing unit corrects the image blur at an angle equal to or more than half of an image blur correction angle at the wide angle end, and the tilt image stabilizing unit corrects the image blur at an angle equal to or more than half of an image blur correction angle at the telephoto end.

3. A zoom lens according to claim 1, wherein the following conditional expression is satisfied:

$$1.0 < |TSt| < 5.0,$$

where TSt represents a image stabilization sensitivity of the tilt image stabilizing unit at the telephoto end.

4. A zoom lens according to claim 1, wherein the following conditional expression is satisfied:

$$2.0 < TSt/Tsw < 100.0,$$

where TSw represents a image stabilization sensitivity of the tilt image stabilizing unit at the wide angle end and TSt represents a image stabilization sensitivity of the tilt image stabilizing unit at the telephoto end.

5. A zoom lens according to claim 1, wherein the following conditional expression is satisfied:

$$0.20 < SSw/SSt < 1.20,$$

where SSw represents a image stabilization sensitivity of the shift image stabilizing unit at the wide angle end and SSt represents a image stabilization sensitivity of the shift image stabilizing unit at the telephoto end.

6. A zoom lens according to claim 1, wherein in a zoom range of a part of an entire zoom range from the wide angle end to the telephoto end, a correction angle of the image blur to be corrected by the shift image stabilizing unit and a correction angle of the image blur to be corrected by the tilt image stabilizing unit are equal to each other.

7. A zoom lens according to claim 1, wherein the following conditional expression is satisfied:

$$fw \times 1.1 < fm < ft \times 0.9,$$

where fm represents a focal length of an entire system at a zoom position where a correction angle of the image blur to be corrected by the shift image stabilizing unit and a correction angle of the image blur to be corrected by the tilt image stabilizing unit are equal to each other, fw represents a focal length of the entire system at the wide angle end, and ft represents a focal length of the entire system at the telephoto end.

8. A zoom lens according to claim 1, wherein the following conditional expression is satisfied:

$$1.0 < SSm/SSw < 2.0,$$

where SSm represents a image stabilization sensitivity of the shift image stabilizing unit at a zoom position where a correction angle of the image blur to be corrected by the shift image stabilizing unit and a correction angle of the image blur to be corrected by the tilt vimage stabilizing unit are equal to each other, and SSw represents a image stabilization sensitivity of the shift image stabilizing unit at the wide angle end.

9. A zoom lens according to claim 1, wherein the following conditional expression is satisfied:

$$0.01 < TSm/TSt < 1.00,$$

where TSm represents a image stabilization sensitivity of the tilt image stabilizing unit at a zoom position where a correction angle of the image blur to be corrected by the shift image stabilizing unit and a correction angle of the image blur to be corrected by the tilt image stabilizing unit are equal to each other, and TSt represents a image stabilization sensitivity of the tilt image stabilizing unit at the telephoto end.

10. A zoom lens according to claim 1, wherein the following conditional expression is satisfied:

$$0.33 < SSm/TSm < 3.0,$$

where SSm and TSm respectively represent image stabilization sensitivities of the shift image stabilizing unit and the tilt image stabilizing unit at a zoom position where a correction angle of the image blur to be corrected by the shift image stabilizing unit and a correction angle of the image blur to be corrected by the tilt image stabilizing unit are equal to each other.

11. A zoom lens according to claim 1,
wherein the zoom lens consists of, in order from the object side to the image side, the first lens unit having the positive refractive power, the second lens unit having the negative refractive power, the third lens unit having the positive refractive power, the fourth lens unit having the negative refractive power, and a fifth lens unit having a positive refractive power, each interval between adjacent lens units being changed during zooming, and wherein the tilt image stabilizing unit comprises one of the first lens unit and the second lens unit, and the shift image stabilizing unit comprises one of the third lens unit and the fourth lens unit.

12. A zoom lens according to claim 1,
wherein the zoom lens consists of, in order from the object side to the image side, the first lens unit having the positive refractive power, the second lens unit having the negative refractive power, the third lens unit having the positive refractive power, and the fourth lens unit having the positive refractive power, each interval between adjacent lens units being changed during zooming, and wherein the tilt image stabilizing unit comprises one of the first lens unit and the second lens unit, and the shift image stabilizing unit comprises the third lens unit.

13. An image pickup apparatus comprising:
a zoom lens; and
an image pickup element configured to receive an image formed by the zoom lens,
wherein the zoom lens comprises, in order from an object side to an image side:
a first lens unit having a positive refractive power;
a second lens unit having a negative refractive power;
a third lens unit having a positive refractive power;
a fourth lens unit having a positive or negative refractive power;
an aperture stop arranged one of between the second lens unit and the third lens unit, within the third lens unit, and between the third lens unit and the fourth lens unit,
the image pickup apparatus being configured such that, during zooming from a wide angle end to a telephoto end, an interval between the first lens unit and the second lens unit is widened, an interval between the second lens unit and the third lens unit is narrowed, and an interval between the third lens unit and the fourth lens unit is changed; and
a plurality of image stabilizing units configured to be moved in a direction in which the direction has a component in a direction perpendicular to an optical axis during image blur correction,
wherein at least one of the plurality of image stabilizing units comprises a shift image stabilizing unit configured to be moved in the direction perpendicular to the optical axis to carry out the image blur correction,
wherein at least one of the plurality of image stabilizing units comprises a tilt image stabilizing unit configured to be rotated with one of a point on the optical axis and a point near the optical axis as a rotation center to carry out the image blur correction, and
wherein the tilt image stabilizing unit is located closer to the object side than the aperture stop, and the shift image stabilizing unit is located closer to the image side than the tilt image stabilizing unit.

14. An image pickup apparatus according to claim 13, wherein the following conditional expression is satisfied:

$$0.4 < D1/L < 20.0,$$

where D1 represents a distance from an apex of a lens surface closest to the object side of the tilt image stabilizing unit at the telephoto end to the aperture stop, and L represents an effective diagonal length of an imaging surface of the image pickup element.

15. An image pickup apparatus according to claim 13, wherein the following conditional expression is satisfied:

$$0.5 < D2/L < 20.0,$$

where D2 represents a distance from an apex of a lens surface closest to the object side of the tilt image stabilizing unit at the telephoto end to an apex of a lens surface closest to the object side of the shift image stabilizing unit, and L represents an effective diagonal length of an imaging surface of the image pickup element.

16. An image pickup apparatus according to claim 13, wherein the following conditional expression is satisfied:

$$3.0 < R/L < 30.0,$$

where R represents a distance from an apex of a lens surface closest to the object side of the tilt image stabilizing unit to a rotation center during the image blur correction, and L represents an effective diagonal length of an imaging surface of the image pickup element.

* * * * *